(12) United States Patent
Allore et al.

(10) Patent No.: US 9,350,840 B2
(45) Date of Patent: May 24, 2016

(54) MOBILE ELECTRONIC DEVICE WITH ENHANCED TOLERANCE ACCUMULATOR

(75) Inventors: Joseph L. Allore, Mundelien, IL (US); Gary R. Weiss, Buffalo Grove, IL (US); Jason P. Wojack, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 324 days.

(21) Appl. No.: 13/431,311

(22) Filed: Mar. 27, 2012

(65) Prior Publication Data

US 2013/0016050 A1 Jan. 17, 2013

Related U.S. Application Data

(60) Provisional application No. 61/507,406, filed on Jul. 13, 2011.

(51) Int. Cl.
*G06F 3/041* (2006.01)
*H04M 1/18* (2006.01)
*H04M 1/02* (2006.01)

(52) U.S. Cl.
CPC ............ *H04M 1/185* (2013.01); *H04M 1/0202* (2013.01)

(58) Field of Classification Search
CPC ............................ H04M 1/0202; H04M 1/185
USPC ........................ 345/173–178, 156, 169, 905; 455/575.1, 575.8; 361/679.01–679.02, 361/679.09, 679.3, 679.56, 658
See application file for complete search history.

(56) References Cited

U.S. PATENT DOCUMENTS

| | | | |
|---|---|---|---|
| 4,764,846 A | 8/1988 | Go | |
| 6,229,695 B1 | 5/2001 | Moon | |
| 6,285,893 B1 | 9/2001 | Keirinbou | |
| 6,381,124 B1 | 4/2002 | Whitcher et al. | |
| 6,437,238 B1 | 8/2002 | Annerino et al. | |
| 6,517,967 B1 | 2/2003 | Shrim et al. | |
| 6,967,280 B1 | 11/2005 | Boatwright et al. | |
| 7,046,201 B2 | 5/2006 | Okada | |
| 7,139,533 B2 | 11/2006 | Katagishi et al. | |
| 7,436,676 B2 * | 10/2008 | Higuchi et al. | 361/752 |
| 7,536,009 B2 | 5/2009 | Lee | |

(Continued)

FOREIGN PATENT DOCUMENTS

| | | |
|---|---|---|
| JP | 2003-283166 | 10/2003 |
| JP | 2008-252366 | 10/2008 |

(Continued)

OTHER PUBLICATIONS

Korean Patent Office, Notice of Preliminary Rejection in Korean Patent Application No. 20/2012-1632 (Jul. 22, 2013).

(Continued)

*Primary Examiner* — Amare Mengistu
*Assistant Examiner* — Stacy Khoo
(74) *Attorney, Agent, or Firm* — Wolfe-SBMC

(57) ABSTRACT

A mobile electronic device 10 with an enhanced tolerance accumulator 106 is disclosed. The device 10 can include: a housing 150 including a front housing 34 and a rear housing 86; and a user interface 62, the rear housing 86 including a tolerance accumulator 106. Advantageously, this construction provides a robust and durable low profile mobile electronic device, desired by users and the tolerance accumulator 106 provides a durable structure capable of expanding or contracting, as necessary.

20 Claims, 18 Drawing Sheets

(56) References Cited

U.S. PATENT DOCUMENTS

| | | | |
|---|---|---|---|
| 7,555,320 | B2 | 6/2009 | Rydgren |
| 7,570,314 | B2 | 8/2009 | Lee |
| 7,627,296 | B2 | 12/2009 | Kezys et al. |
| 7,633,747 | B2 | 12/2009 | Yang et al. |
| 7,649,744 | B2 | 1/2010 | Zadesky et al. |
| 7,676,242 | B2 | 3/2010 | Siddiqui |
| 7,724,532 | B2 | 5/2010 | Zadesky et al. |
| 7,881,068 | B2 | 2/2011 | Vatanparast et al. |
| 7,890,133 | B2 | 2/2011 | Qi et al. |
| 8,289,689 | B2 | 10/2012 | Chen et al. |
| D671,930 | S | 12/2012 | Akana et al. |
| 8,639,303 | B2 | 1/2014 | Allore et al. |
| 8,922,980 | B2 | 12/2014 | Allore et al. |
| 9,124,676 | B2 | 9/2015 | Allore et al. |
| 9,143,586 | B2 | 9/2015 | Allore et al. |
| 2004/0127270 | A1 | 7/2004 | Wulff et al. |
| 2004/0159954 | A1 | 8/2004 | Hetzel et al. |
| 2004/0203488 | A1 | 10/2004 | Sullivan et al. |
| 2004/0263482 | A1 | 12/2004 | Goertz |
| 2006/0172785 | A1 | 8/2006 | Phillips et al. |
| 2006/0180197 | A1 | 8/2006 | Gui et al. |
| 2006/0205111 | A1 | 9/2006 | Gross |
| 2006/0250762 | A1 | 11/2006 | Yang et al. |
| 2006/0255444 | A1 | 11/2006 | Moshayedi |
| 2006/0292436 | A1 | 12/2006 | Cook et al. |
| 2007/0121307 | A1 | 5/2007 | Yang et al. |
| 2008/0019502 | A1 | 1/2008 | Emmert et al. |
| 2008/0117570 | A1 | 5/2008 | Laaksonen et al. |
| 2008/0179636 | A1 | 7/2008 | Chidambarrao et al. |
| 2008/0207283 | A1 | 8/2008 | Zaitsu et al. |
| 2008/0252552 | A1 | 10/2008 | Goebel et al. |
| 2008/0291647 | A1 | 11/2008 | Hirota et al. |
| 2009/0002242 | A1 | 1/2009 | Lasarov et al. |
| 2009/0059485 | A1 | 3/2009 | Lynch et al. |
| 2009/0059502 | A1* | 3/2009 | Filson et al. .............. 361/681 |
| 2009/0116202 | A1 | 5/2009 | Kim et al. |
| 2009/0137293 | A1* | 5/2009 | Yoo et al. ................ 455/575.4 |
| 2009/0152742 | A1* | 6/2009 | Ikeguchi et al. .......... 257/778 |
| 2009/0257207 | A1 | 10/2009 | Wang et al. |
| 2009/0312066 | A1 | 12/2009 | Lee et al. |
| 2010/0045612 | A1* | 2/2010 | Molne ..................... 345/173 |
| 2010/0053861 | A1 | 3/2010 | Kim et al. |
| 2010/0061040 | A1 | 3/2010 | Dabov et al. |
| 2010/0068607 | A1 | 3/2010 | Spare et al. |
| 2010/0105452 | A1 | 4/2010 | Shin et al. |
| 2010/0112964 | A1 | 5/2010 | Yi et al. |
| 2010/0134968 | A1 | 6/2010 | Kobayashi et al. |
| 2010/0151925 | A1 | 6/2010 | Vedurmudi et al. |
| 2010/0157515 | A1 | 6/2010 | Tseng |
| 2010/0165555 | A1 | 7/2010 | Tobiyama et al. |
| 2010/0178957 | A1 | 7/2010 | Chen |
| 2010/0195296 | A1 | 8/2010 | Nishiwaki |
| 2010/0258626 | A1 | 10/2010 | Watanabe et al. |
| 2010/0285850 | A1 | 11/2010 | Paleczny et al. |
| 2010/0291974 | A1 | 11/2010 | Lu et al. |
| 2010/0316896 | A1* | 12/2010 | Van Schyndel et al. ........ 429/94 |
| 2011/0021255 | A1 | 1/2011 | Kim et al. |
| 2012/0074007 | A1 | 3/2012 | Drummer |
| 2012/0194393 | A1* | 8/2012 | Uttermann et al. ........... 343/702 |
| 2013/0016485 | A1 | 1/2013 | Allore et al. |
| 2013/0016486 | A1 | 1/2013 | Allore et al. |
| 2013/0017864 | A1 | 1/2013 | Allore et al. |
| 2013/0017865 | A1 | 1/2013 | Allore et al. |
| 2013/0050026 | A1 | 2/2013 | Vin et al. |

FOREIGN PATENT DOCUMENTS

| | | | |
|---|---|---|---|
| KR | 10-2011-0075707 A1 | | 7/2011 |
| WO | WO 2010/127749 A1 | | 11/2010 |

OTHER PUBLICATIONS

Korean Patent Office, Notice of Preliminary Rejection in Korean Patent Application No. 20-2012-1633 (Sep. 3, 2013).
Korean Patent Office, Notice of Preliminary Rejection in Korean Patent Application No. 20-2012-1635 (Sep. 30, 2013).
"Advisory Action", U.S. Appl. No. 13/431,189, Jun. 18, 2014, 2 pages.
"Final Office Action", U.S. Appl. No. 13/431,133, May 6, 2014, 16 pages.
"Final Office Action", U.S. Appl. No. 13/431,189, Apr. 10, 2014, 12 pages.
"Final Office Action", U.S. Appl. No. 13/439,493, Feb. 10, 2015, 13 pages.
"Non-Final Office Action", U.S. Appl. No. 13/431,133, Jan. 10, 2014, 15 pages.
"Non-Final Office Action", U.S. Appl. No. 13/431,189, Jul. 31, 2013, 10 pages.
"Non-Final Office Action", U.S. Appl. No. 13/431,189, Aug. 5, 2014, 12 pages.
"Non-Final Office Action", U.S. Appl. No. 13/431,250, Jun. 26, 2013, 8 pages.
"Non-Final Office Action", U.S. Appl. No. 13/431,493, Sep. 25, 2014, 13 pages.
"Notice of Allowance", U.S. Appl. No. 13/431,113, Aug. 20, 2014, 9 pages.
"Notice of Allowance", U.S. Appl. No. 13/431,189, Jan. 9, 2015, 8 pages.
"Notice of Allowance", U.S. Appl. No. 13/431,189, Apr. 24, 2015, 8 pages.
"Notice of Allowance", U.S. Appl. No. 13/431,250, Nov. 13, 2013, 7 pages.
"Notice of Allowance", U.S. Appl. No. 13/431,493, May 20, 2015, 8 pages.
"Restriction Requirement", U.S. Appl. No. 13/431,493, Jun. 5, 2014, 7 pages.

* cited by examiner

MOBILE ELECTRONIC DEVICE WITH ENHANCED TOLERANCE ACCUMULATOR

BACKGROUND OF THE INVENTION

1. Field of the Disclosure

The disclosure relates in general to improved mobile electronic devices.

2. Background Art

There is a significant market for mobile electronic devices with large user interfaces, durable displays and thin profiles. Many have tried to provide such devices, but they have failed to withstand tough user environments.

A mobile electronic device with an enhanced chassis with minimal Z dimension, would be considered an improvement in the art.

A mobile electronic device with enhanced laminate construction with minimal Z dimension, would be considered an improvement in the art.

A mobile electronic device with an enhanced tolerance accumulator, adapted for allowing expansion or contraction as needed, would be considered an improvement in the art.

A mobile electronic device with an enhanced antenna farm would be considered an improvement in the art.

A mobile electronic device with enhanced impact absorber with improved impact mitigation, would be considered an improvement in the art.

Further, robust mobile electronic devices with thin profiles, that can withstand tough user environments, would be considered an improvement in the art.

It is therefore desirable to provide an improved mobile electronic device which overcomes most, if not all, of the preceding needs.

DETAILED DESCRIPTION OF THE INVENTION

The following is a detailed description and explanation of the preferred embodiments of the invention and best modes for practicing the invention.

A. Mobile Electronic Device with an Enhanced Chassis

Figure 1:
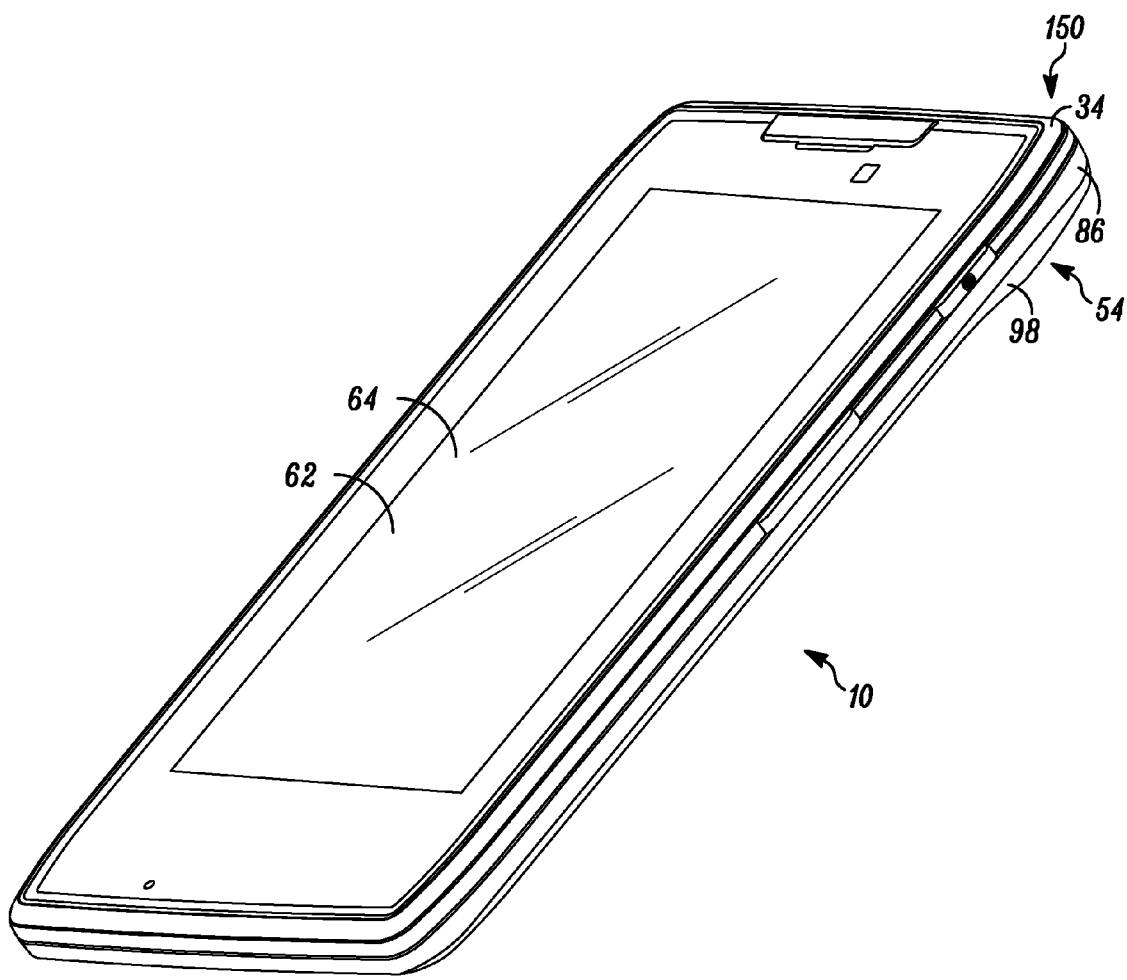
FIG. 1 is an exemplary front perspective view of a mobile electronic device, in accordance with principles of the present invention.
Figure 4:
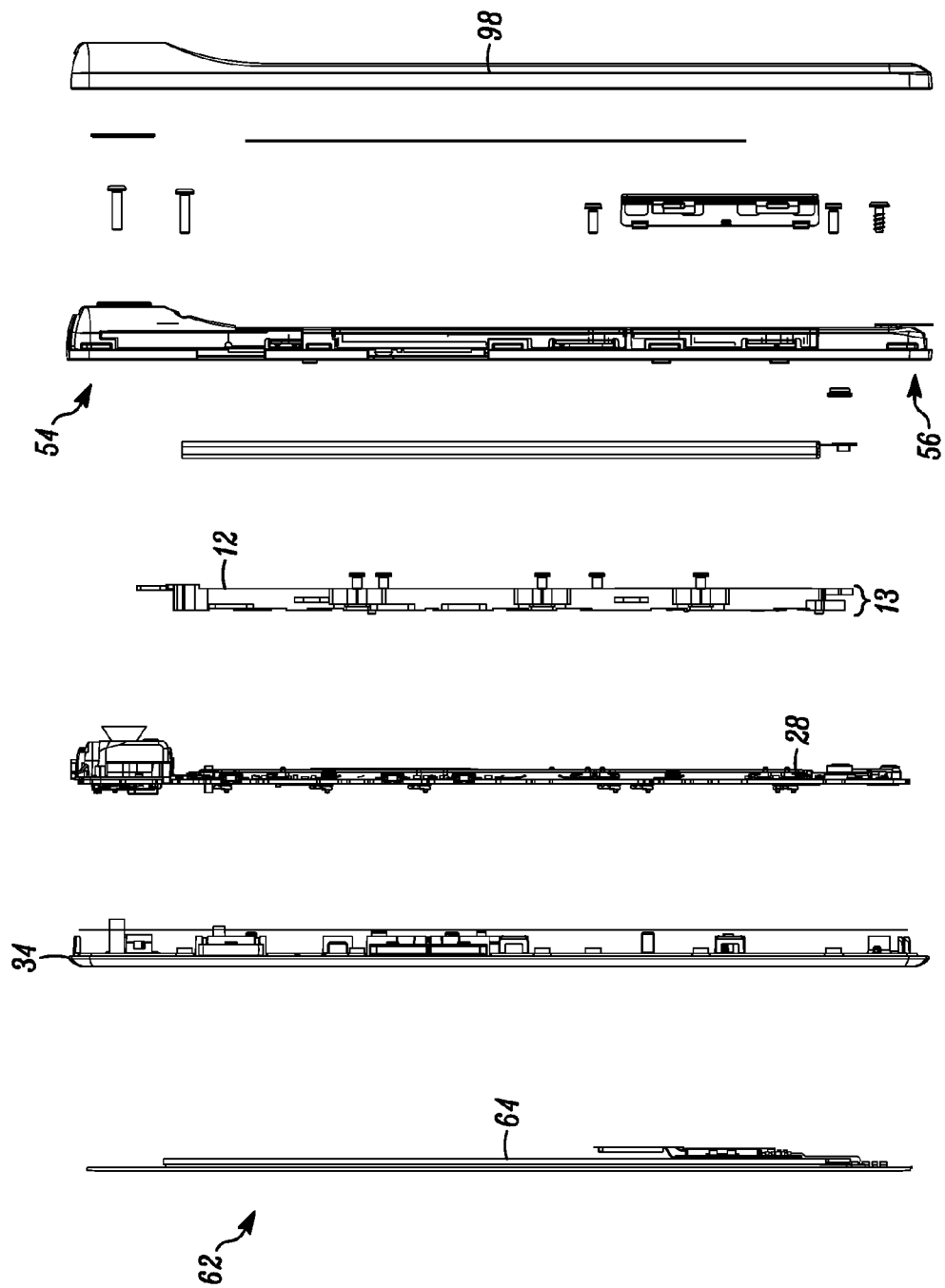
FIG. 4 is an exemplary side exploded view of an embodiment of the mobile electronic device in FIG. 1, showing various components making up the mobile electronic device, in accordance with principles of the present invention.
Figure 6:
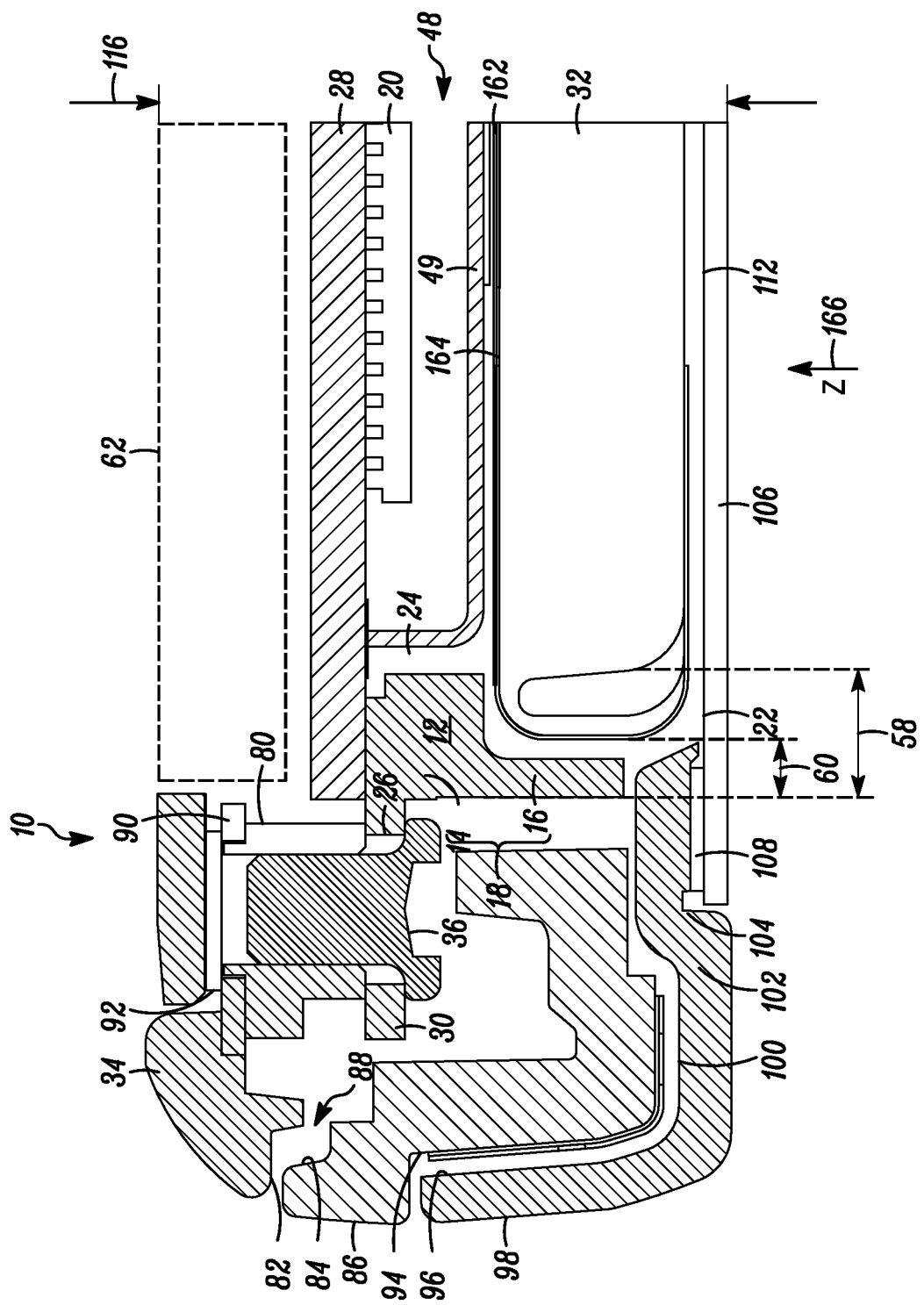
FIG. 6 is an enlarged partial exemplary general X-sectional view of an embodiment of the mobile electronic device in FIG. 10, showing various components making up the mobile electronic device, in accordance with principles of the present invention.

As best shown in FIGS. 1 and 6, a mobile electronic device 10 with an enhanced chassis is shown. The device 10 can include: a frame (or chassis) 12 including an upper portion 14 and a lower portion 16 defining a narrow profile height 18 having an open top 20 and an open bottom 22; the frame 12 including an interior portion 24 configured to surround components in a predetermined arrangement and an exterior portion 26; the exterior portion 26 of the frame 12 being connected to a printed circuit board (PCB) 28; and the open top 20 being configured to receive components on the printed circuit board 28 and the open bottom 22 being configured to receive a battery 32. Advantageously, this construction helps to provide a robust design and durable low profile mobile electronic device 10, desired by users. The frame 12 height 13 (FIG. 4) provides a narrow profile structural system to securely support, stack and connect components in connection with mobile electronic devices. Beneficially, the frame 12 is structurally passive or free from disadvantageously contributing to the profile or overall depth in the Z-direction, as detailed herein. The frame 12 is also adapted to be populated with an many components as desired and can receive components on top of each other in a stacked relationship, to provide a narrow Z dimension.

Figure 3:
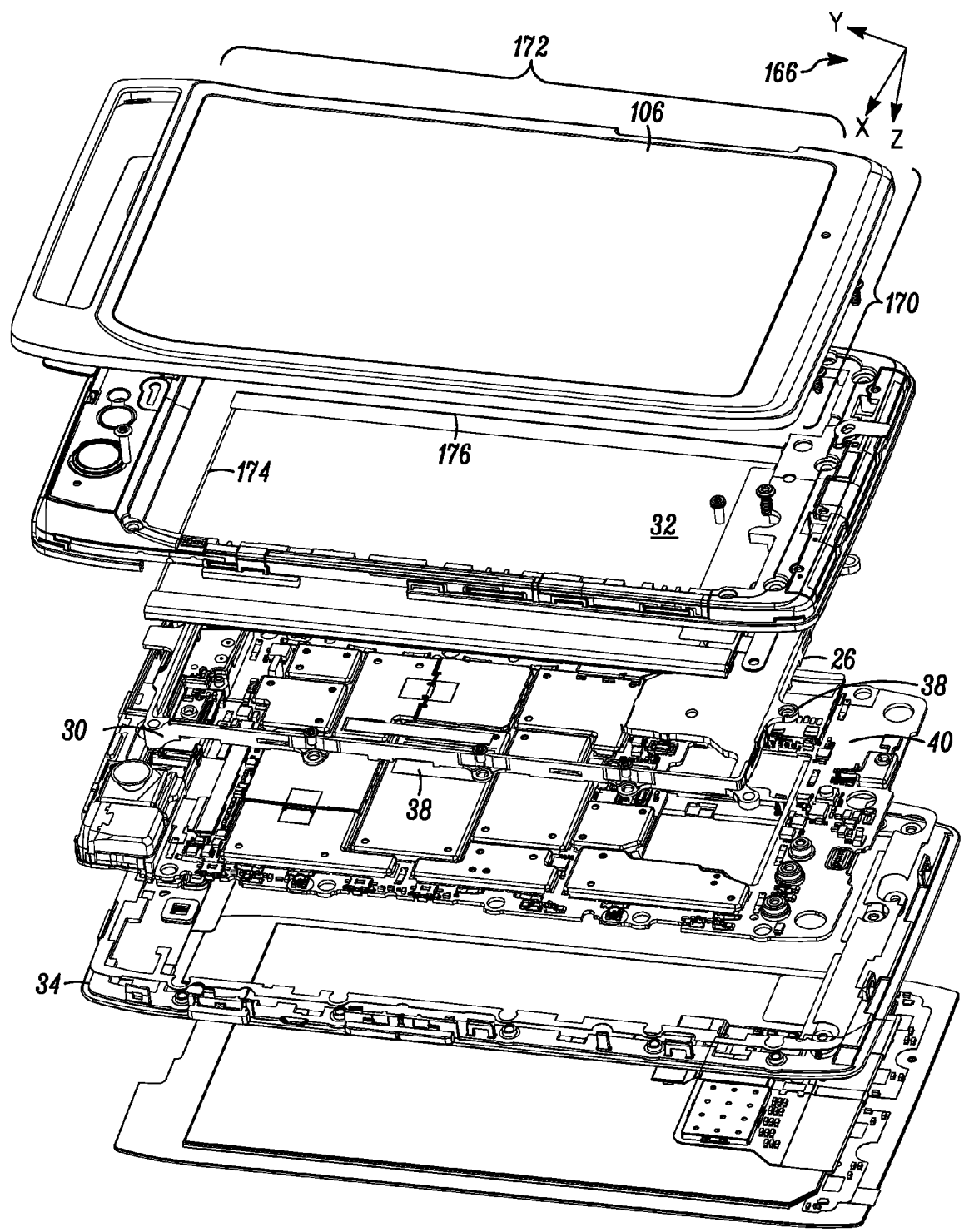
FIG. 3 is an exemplary rear exploded view of an embodiment of the mobile electronic device in FIG. 1, showing various components making up the mobile electronic device, in accordance with principles of the present invention.

As best shown in FIGS. 3 and 6, the exterior portion 26 of the frame 12 is connected to the printed circuit board 28 and a front housing 34 with a connector, shown as a screw 36, connected to an outwardly extending flange 30 in proximity to the upper portion 14 of the frame 12. As should be understood, the connector can be a snap connector, screw, adhesives and the like. This structure provides ease of access, assembly and disassembly. Beneficially, this structure provides a secure frame, printed circuit board and front housing connection that can withstand the rough environment it will be exposed to in normal use.

As best shown in FIGS. 2, 3, 9 and 10, the exterior portion 26 of the frame 12 can be connected to the printed circuit board 28 and a front housing 34 with a plurality of connectors and connections 38, to provide a secure interconnect around a periphery of the frame 12.

Figure 9:
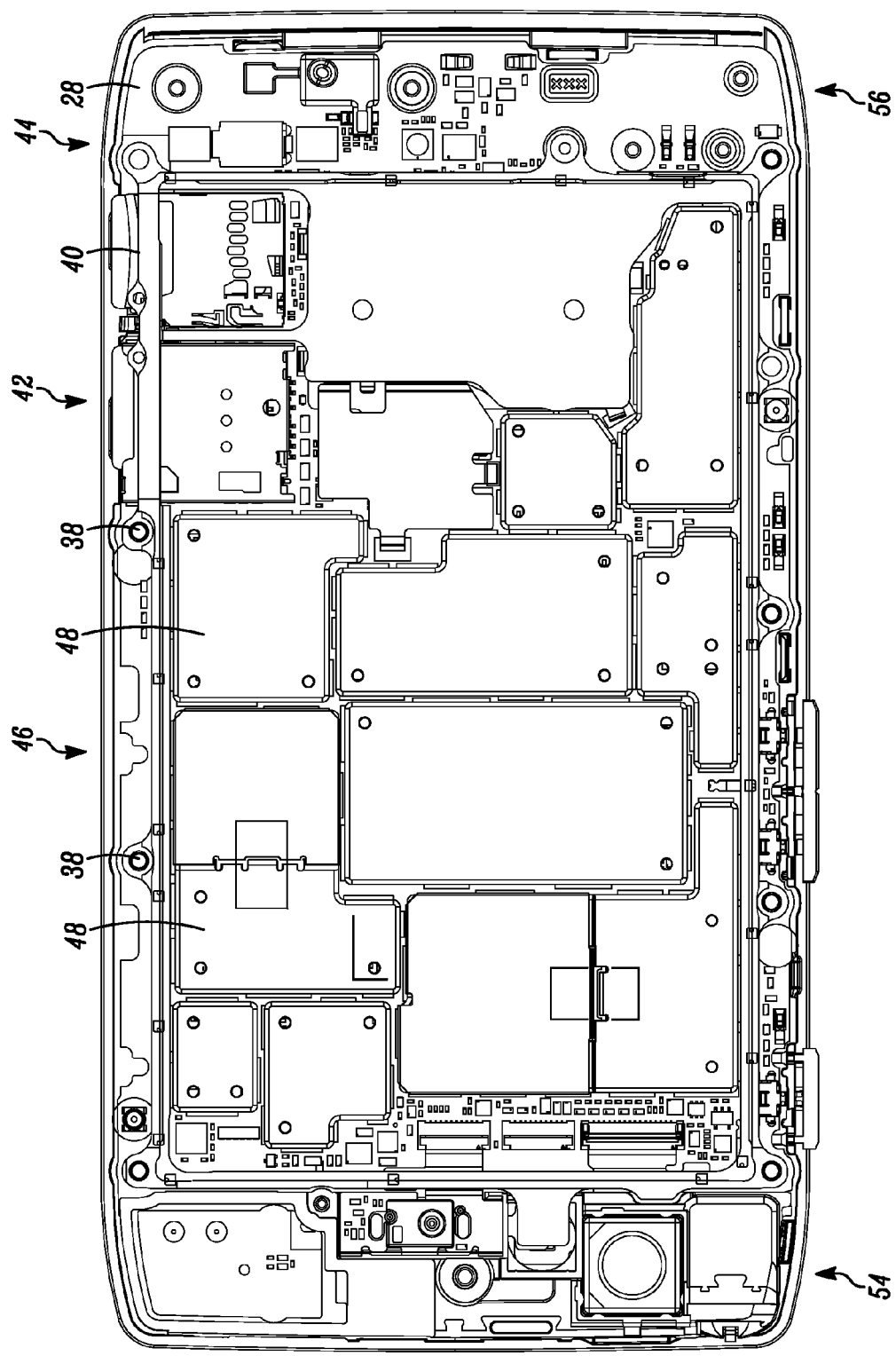
FIG. 9 is an exemplary enlarged layout view of an embodiment of the mobile electronic device in FIG. 1, showing the placement of various components making up the mobile electronic device, in accordance with principles of the present invention.
Figure 10:
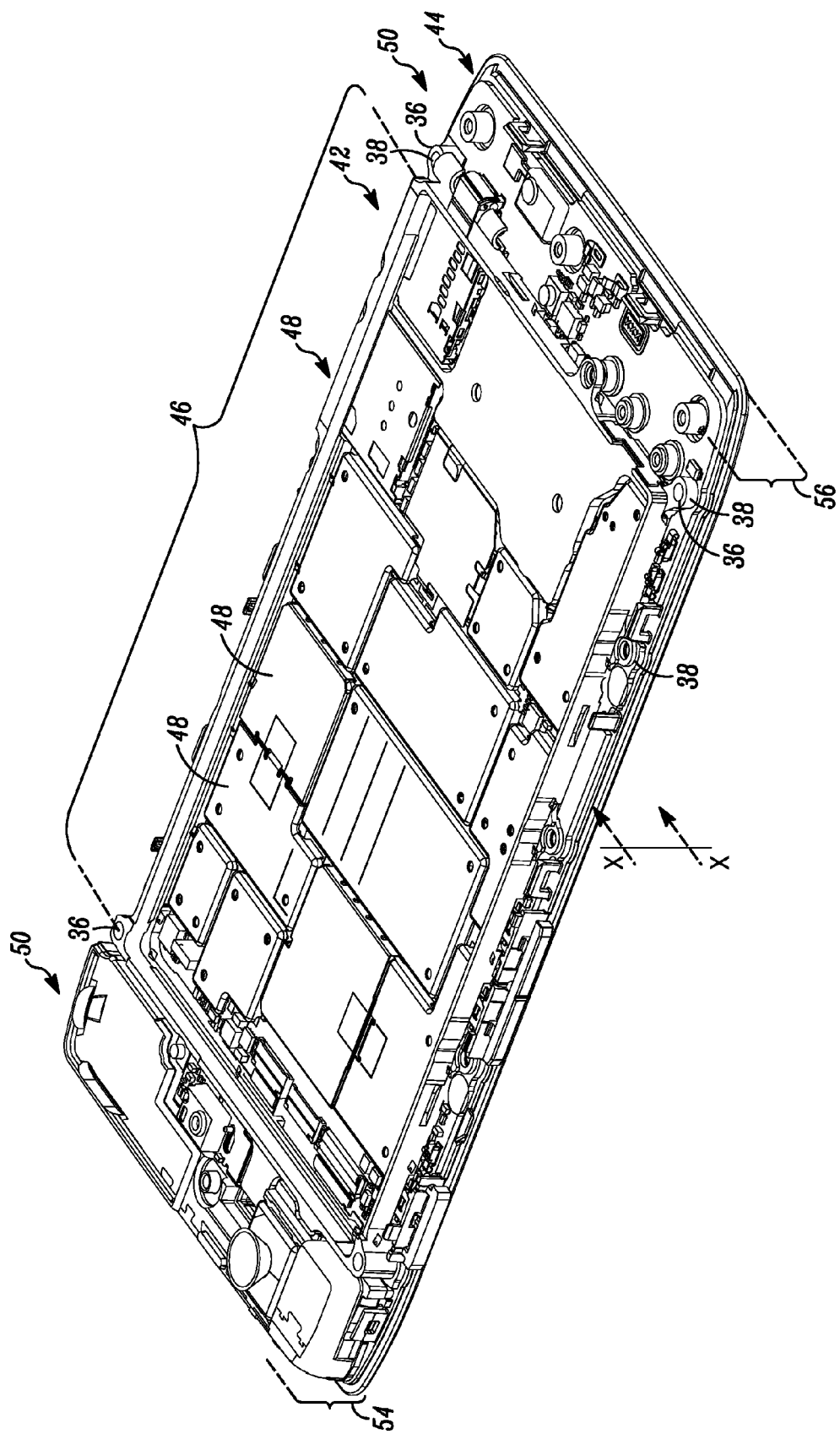
FIG. 10 is an exemplary enlarged perspective layout view of an embodiment of the mobile electronic device in FIG. 9, showing the placement of various components making up the mobile electronic device, in accordance with principles of the present invention.

As shown in FIGS. 9 and 10, the frame 12 is generally rectangular and includes X-Y dimensions 42 about 95 percent or less of the X-Y dimensions 44 of the printed circuit board 28 it is connected to. The frame 12 provides enhanced structural integrity defined by its X-Y dimensions 42, as detailed herein.

As shown in FIGS. 9 and 10, the frame 12 is connected to a printed circuit board 28, defining a reservoir area 46 configured to receive reservoir components 48. The reservoir components 48 can include chips, chips with shields, and the like on a circuit board and a battery. In one embodiment, many of the reservoir components 48 are shielded for EMI protection. In a preferred embodiment, the battery 32 is stacked on top of the reservoir components 48.

The frame 12 can be configured to receive reservoir components 48 and an area outside the frame 12 defines a non-reservoir area 50 configured to receive non-reservoir components 52. The non-reservoir components 52 can include irregularly shaped components, tall components, vibrators, antennas, ringers, microphones, speakers and the like, components that are not adapted to be fit in the reservoir area 46 due to size, and components better located in non-reservoir area 50, for design reasons or aesthetic reasons. The non-reservoir area 50 can include wide and narrow compartments 54 and 56, as shown in FIG. 10. The wide compartment 54 can include a micro USB, micro HDMI, rear and front facing cameras, head set jack, flash, and the like.

Referring back to FIG. 6, the interior portion 24 includes a first wall width 58 in proximity to the upper portion 14 and a second wall width 60 in proximity to the lower portion 16 of the frame 12. In a preferred embodiment, the first wall width 58 is greater than the second wall width 60, so as to accommodate components, such as shields, chips and the like on a circuit board and a battery, respectively. In a preferred embodiment, the first wall width 58 is complementarily configured to receive electronic components 48 and the second wall width 60 is complementarily configured to receive a battery 32, the electronic components 48 and battery 32 can define a critical stack and narrow profile in the Z dimension 116. Advantageously, the widths and complementarily configured constructions, defining a step, are dimensioned, so as to accommodate reservoir components 48 and the battery 32 in a stacked and narrow profile relationship.

Figure 7:
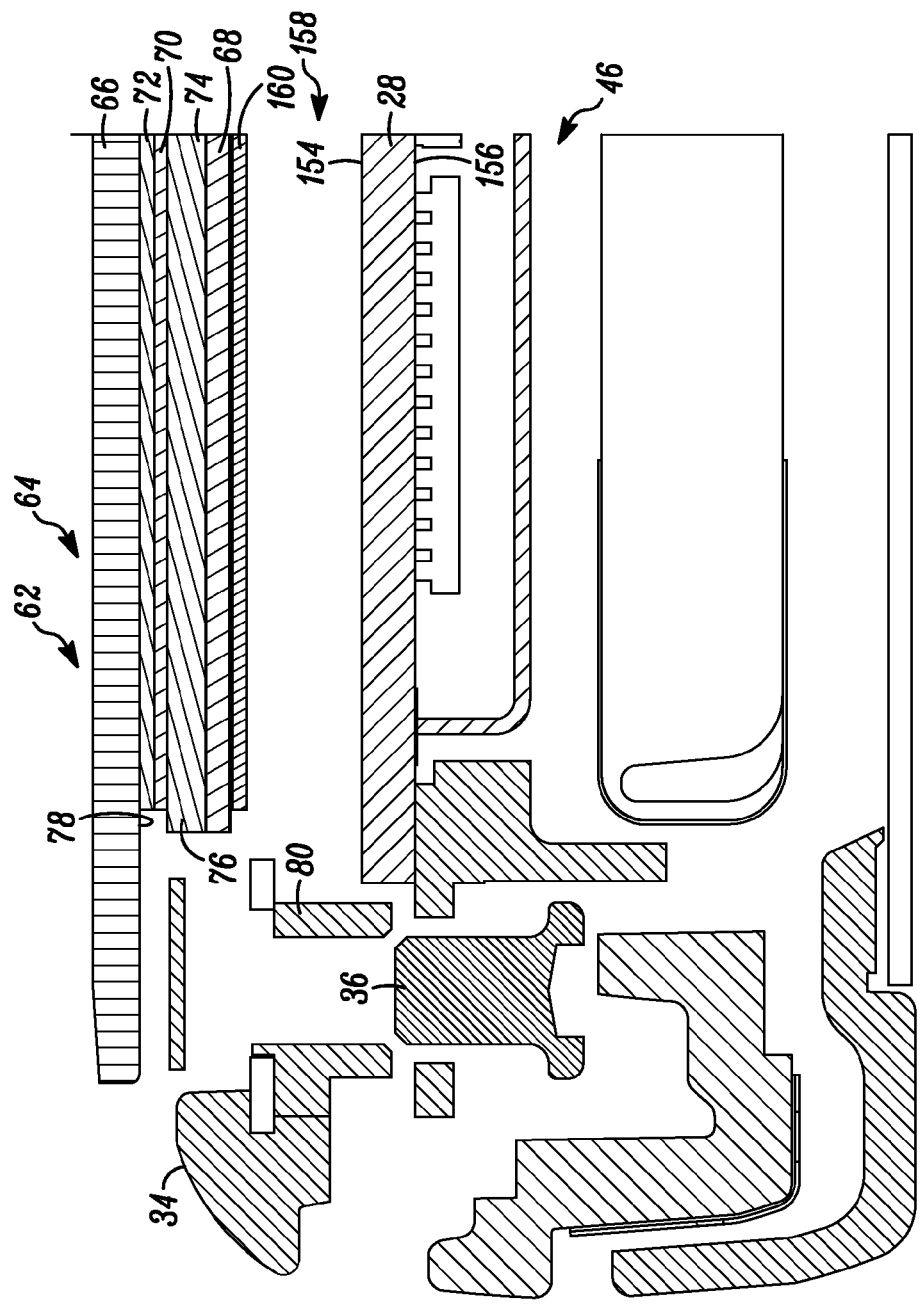
FIG. 7 is an enlarged partial exemplary general X-sectional view of an embodiment of the mobile electronic device in FIG. 10, showing various components making up the mobile electronic device and how they could be assembled and interconnected, in accordance with principles of the present invention.
Figure 8:
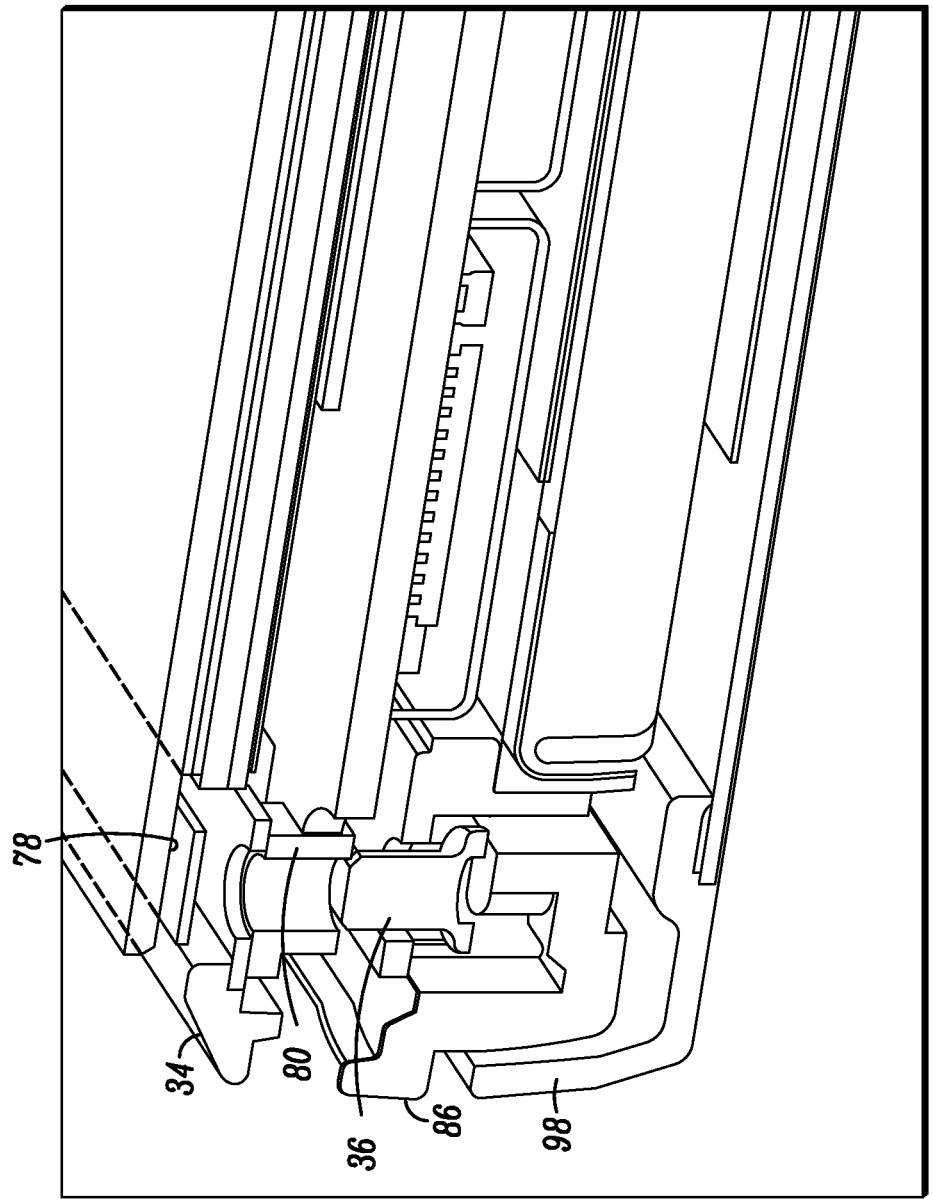
FIG. 8 is an enlarged partial exemplary perspective view of an embodiment of the mobile electronic device in FIG. 7, showing various components making up the mobile electronic device and how they could be assembled and interconnected, in accordance with principles of the present invention.

As shown in FIG. 7, the frame 12 is connected to a front housing 34 including a user interface 62. The user interface 62 can include a touch screen display 64. Users are comfortable utilizing touch screen displays, to operate an electronic device. The touch screen display 64 can include a lens 66 bonded with a bond 70 to a display 68. In a preferred embodiment, the lens 66 is bonded to the display 68 with at least one of an Optically Clear Adhesive (OCA) and Super Viewing Resin (SVR). The lens 66 can provide a protective shield and can include a clear plastic, polycarbonate, acrylic and the like. A preferred lens 66 comprises guerilla glass, known as Corning 2317 or 2318, for enhanced durability. An Indium Tin Oxide (ITO) layer can be sputtered or deposited on a top 76 of the display 68 or on a bottom 78 of the lens 66, for providing good touch screen display characteristics. Users like touch screen displays in electronic devices.

In FIG. 6, the frame 12 is connected to a front housing 34 via connection receptacle 80. This structure provides a secure interconnection between the front housing and the rear housing at a plurality of surfaces. The front housing 34 includes an outer and lower periphery 82 complementarily configured to be nested with and received by an upper and inner periphery 84 of a rear housing 86, for minimizing profile in the Z dimension 116. In use, when the device 10 is disadvantageously dropped or impacted, peripheries 82 and 84, do not touch and maintain a gap 88 for enhanced drop isolation between the user interface 62 and rear housing, as detailed herein. Also, an upper section 90 of the connection receptacle 80 can be adhesively 92 connected to the lens 66, in one embodiment.

In a preferred embodiment, in FIG. 6, the rear housing 86 can include an outer and lower periphery 94 complementarily configured to be nested with and received by an upper and inner periphery 96 of a trim module 98, with a gap 100. The nested construction minimizes the Z dimension and the gap 100 provides impact isolation, as detailed herein. The trim module 98 can include an inner section 102 including a downwardly facing interface 104 connected to a tolerance accumulator 106. This structure provides a secure interconnection between the trim module 98 and the tolerance accumulator 106. These structures can be adhesively 108 connected at the downwardly facing interface 104 with a channel 110.

In one embodiment, the tolerance accumulator 106 includes an inner facing surface 112 adhesively 114 connected to a battery 32. This structure provides a secure interconnection between the inner facing surface 112 of the tolerance accumulator 106 and the battery, for minimizing the Z dimension. 116, in FIG. 6.

The mobile electronic device 10 includes at least one of: a flip phone, slider phone, portable networking device, internet communications device, clamshell device, tablet device, radio telephone, cellular phone, mobile phone, smart phone, portable gaming device, personal digital assistant, wireless e-mail device, two-way pager, mobile computing device and handheld electronic device, preferably a cellular phone in the form of a smart phone or tablet, with a minimal Z dimension In one embodiment, the front housing 34 comprises a resilient material that can withstand the harsh environment that it will be exposed to, such as a plastic and the like. Likewise, the rear housing 86 and trim module 98 can be made of a similar material. Also, the frame 12 comprises a metallic material that can provide a durable chassis-like structure and shielding that can be grounded to the printed circuit board 28.

In one embodiment, the frame 12 includes dimensions to substantially encompass the battery, to provide enhanced durability, stiffness and robustness.

A mobile electronic device in accordance with claim 20 wherein the frame 12 and a display 64 include similar X-Y dimensions, to provide enhanced structural reinforcement, to help minimize possibility of damage to the display.

In another embodiment, the frame 12 includes an external portion and positioned away therefrom, are a plurality of antennas 182. Advantageously, this positioning provides enhanced RF transparency being spaced away from frame, and yet is sufficiently close to provide portability.

In another preferred embodiment, the frame 12 is connected to a front housing 34, a printed circuit board 28 and a rear housing 86. This structure provides a secure and durable portable device.

Figure 15:
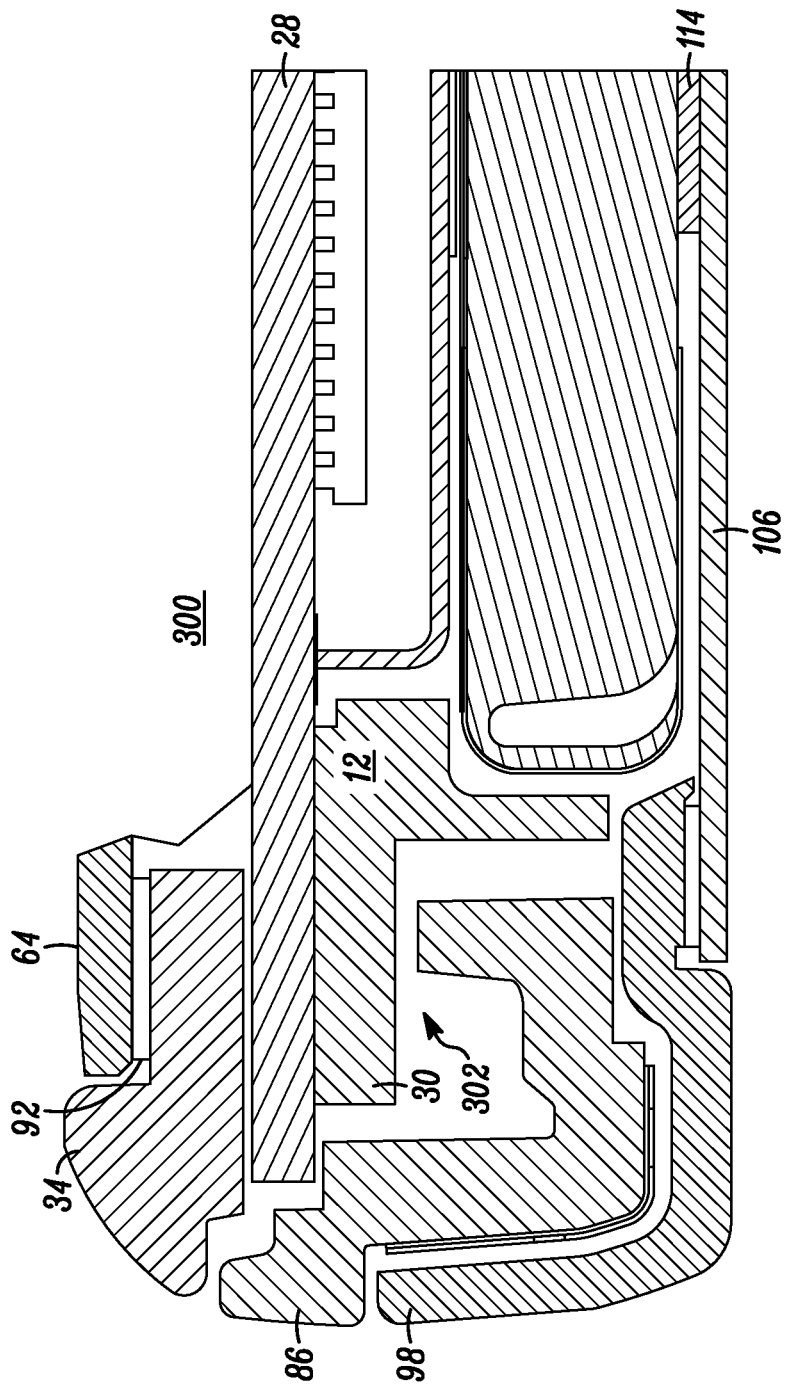
FIG. 15 is an enlarged partial exemplary general X-sectional view of an embodiment of the mobile electronic device in FIG. 10, showing various components making up the mobile electronic device without the need of a screw attachment, in accordance with principles of the present invention.

FIG. 15 is an alternate embodiment of a mobile electronic device 300, free of a connector screw 302, for an enhanced narrow construction without the need of a screw attachment, as shown in FIG. 6

Figure 16:
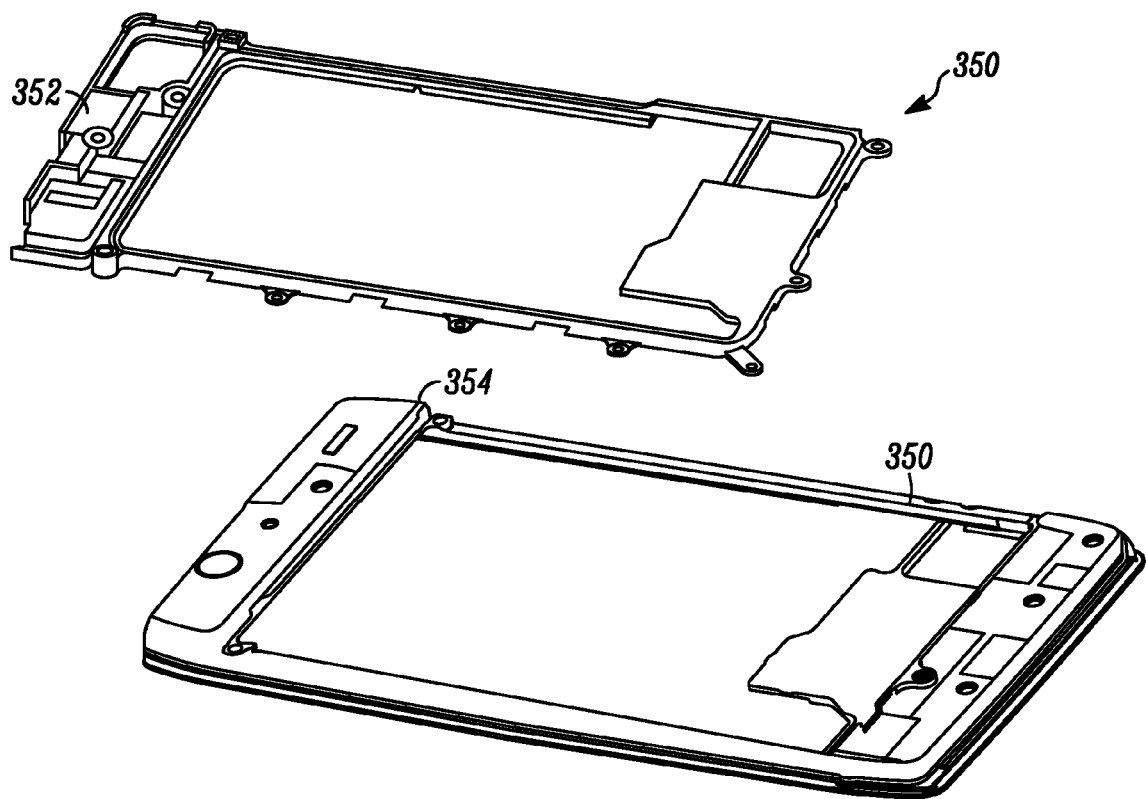
FIG. 16 includes exemplary perspective views of an embodiment of the mobile electronic device in FIG. 1, showing an insert molded frame with an over molded portion in one region and a second over molded portion substantially around the frame, in accordance with principles of the present invention.

In another embodiment, the frame 12 includes an over molded structure. For example, in FIG. 16 a frame 350, such as an insert molded frame, is shown, with a partial over molded component 352 in one region and a second over molded component 354 substantially surrounding the frame. This structure can provide enhanced interconnection of components, alignment, minimal Z profile and RF transparency.

Figure 17:
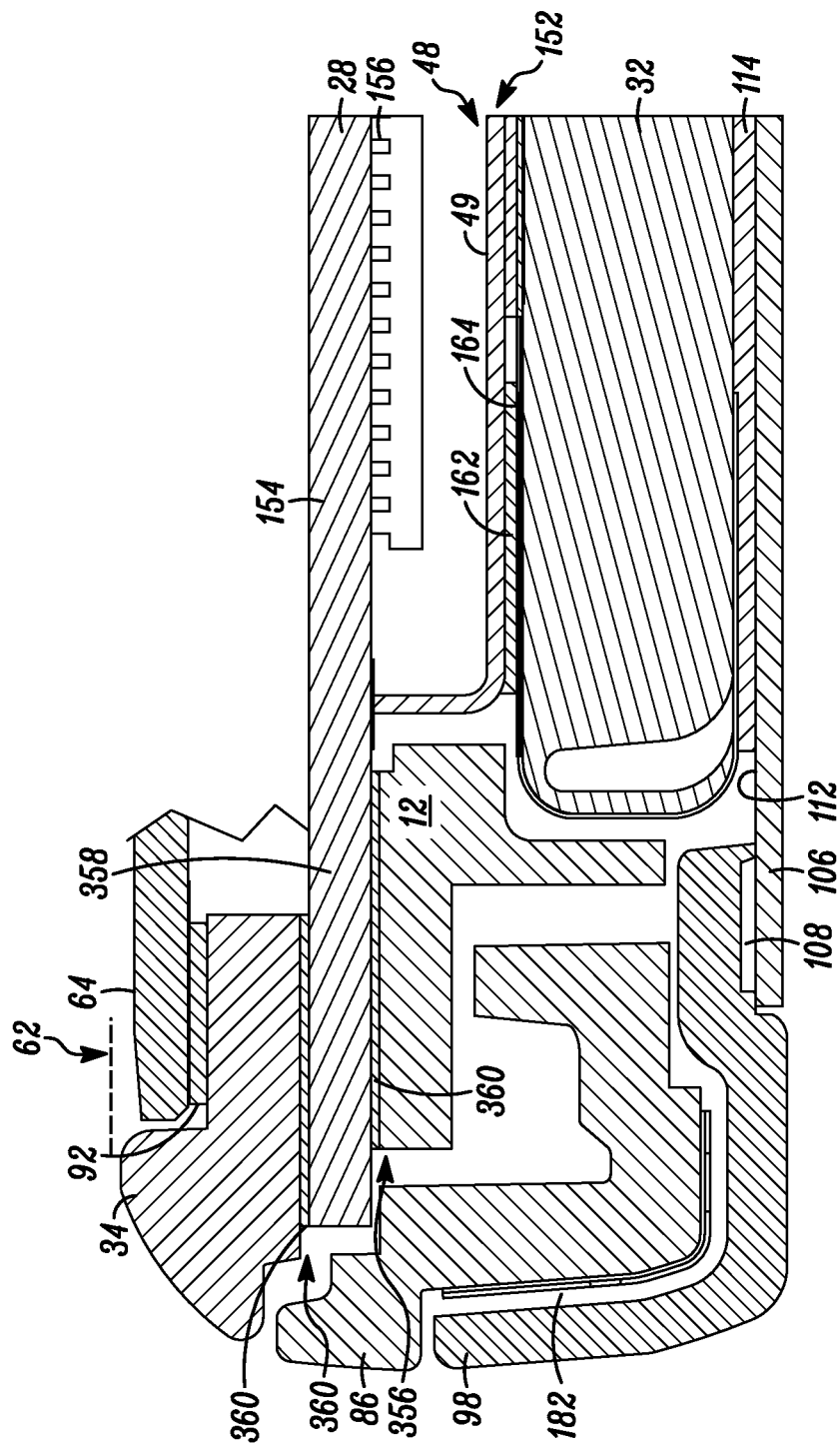
FIG. 17 is an enlarged partial exemplary general X-sectional view of an embodiment of the mobile electronic device in FIG. 10, showing various components making up the mobile electronic device showing a lamination construction, in accordance with principles of the present invention.

FIG. 17 is an enlarged partial exemplary general X-sectional view of an embodiment of the mobile electronic device in FIG. 10, showing various components making up the mobile electronic device showing a lamination construction, as detailed below.

Figure 18:
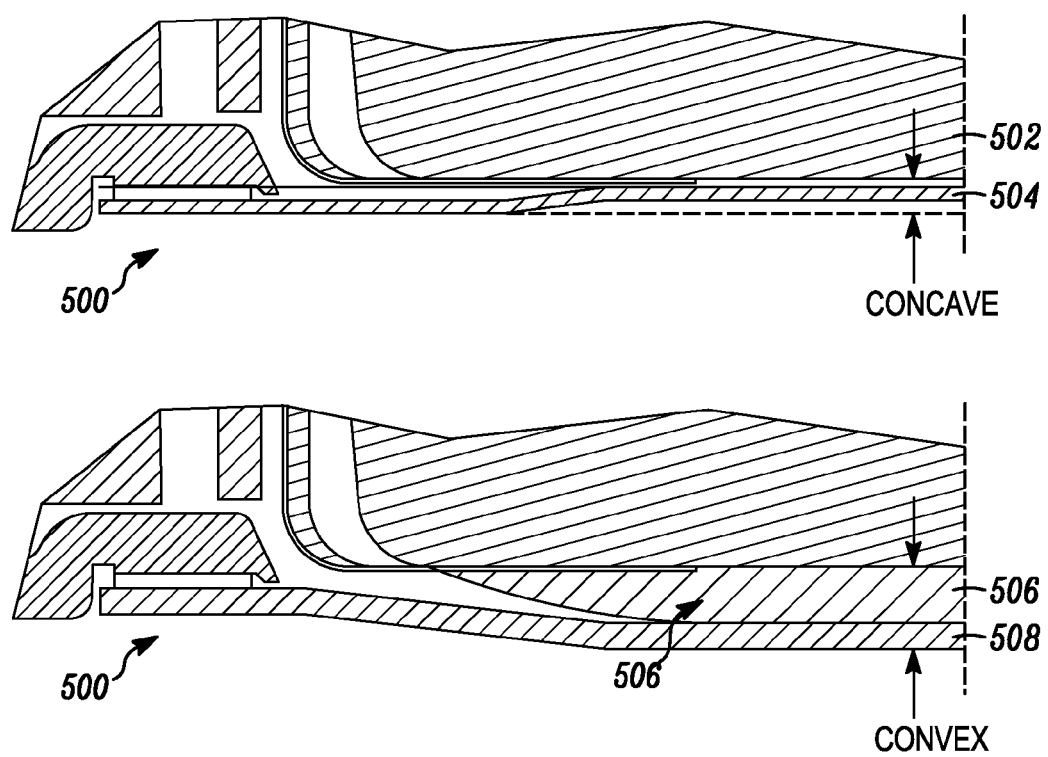
FIG. 18 includes is an enlarged partial exemplary general X-sectional view of an embodiment of the mobile electronic device in FIG. 10, showing a tolerance accumulator illustrated in a concave position configured to contract with battery contraction and a second position showing a convex position configured to expand with battery expansion, in accordance with principles of the present invention.

FIG. 18 includes is an exemplary embodiment of a tolerance accumulator 500 illustrated in a concave or contracted position 504 configured to contract with a battery in a contracted position 504 and a second position showing a convex or expanded position 508 configured to expand with a battery in an expanded position 508, as detailed herein.

Advantageously, in one embodiment, a unique chassis is used with larger planar components of a device, to provide a protective volume that accommodate circuit components and a battery. The invention is particularly adapted for use in a narrow profile device with minimal thickness or z-dimension.

B. Mobile Electronic Device with an Enhanced Laminate Construction

Figure 5:
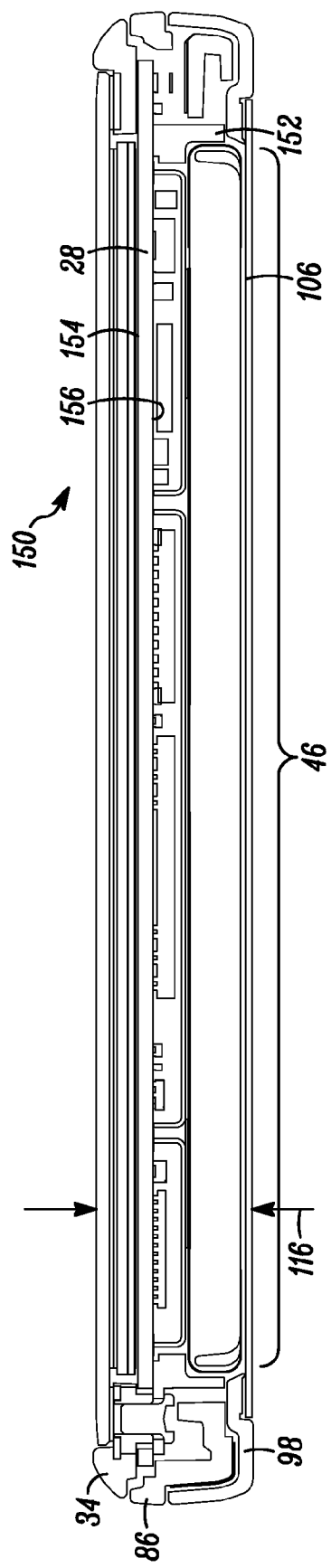
FIG. 5 is an exemplary general X-sectional view of an embodiment of the mobile electronic device in FIG. 10, in accordance with principles of the present invention.

A mobile electronic device 10 with an improved laminate construction is disclosed. As best shown in FIG. 5, the device 10 can include: a housing 150 including a front housing 34 and a rear housing 86; a user interface 62 connected to the front housing 34; and a stack module 152 including a printed circuit board 28 including an outwardly facing side 154 and an inwardly facing side 156, an electronic component 48 attached to the inwardly facing side 156 and a battery 32 attached with laminate 162 to the electronic component 48. Advantageously, this provides a robust and durable low profile multilayer construction for use in connection with mobile electronic devices desired by users.

In a preferred embodiment, as best shown in FIG. 7, the user interface 62 includes a touch screen display 64 which is preferred by many users of electronic devices. The touch screen display 64 can include a lens 66 bonded 70 to a display 68, as previously detailed. The display 64 can be located substantially adjacent to the outwardly facing side 154 of the printed circuit board 28, to minimize the Z dimension 116. In one embodiment, the location can include a narrow air gap 158, or alternatively, a pad 160 can be sandwiched between the display 68 and the outwardly facing side 154 of the printed circuit board, to contribute to the desired narrow profile Z dimension 116. The pad 160 can provide some reinforcement and the gap can provide some isolation, in the event of an undesirable bending, crushing or moderate impact.

The stack module 152 in FIG. 7 can include electronic component(s), such as reservoir components 48 in the reservoir area 46, which can include an integrated circuit(s) reflowed to the printed circuit board 28. This is a common method for attaching integrated circuits, chips and the like to printed circuit boards. As should be understood, other methods can be used. A plurality of integrated circuits shielded or unshielded, can be located in the reservoir area 46. As is known, mobile electronic devices use a plurality of integrated circuits depending on the complexity of the device. In a preferred embodiment, a plurality of integrated circuits are densely populated along and parallel with the printed circuit board, for minimizing the profile in the Z dimension 116 and maximizing space utilization in the reservoir area 46 on the printed circuit board. Likewise, the non-reservoir area utilizes the available space on the PCB 28.

In a preferred embodiment, the stack module 152 includes substantially only laminations and is free of connectors and structure, such as screws, snap connectors and the like, so as to minimize the Z dimension 116.

In FIG. 6, the battery 32 is adhesively attached to at least one or more of the electronic components 48, for enhanced stability and resilience. In a preferred embodiment, the battery 32 is adhesively attached to a plurality of electronic components 48, to provide a robust multi-layer stack and minimize profile in the Z-direction. As previously detailed, the electronic components can be enclosed in a shield or can be free of being enclosed in a shield, so that in the former use case the battery is adhesively attached to the shield and in the latter use case the battery is adhesively attached to an integrated circuit. This construction contributes to minimizing the profile in the Z direction and provides a durable connection within and along the stack module.

In FIG. 6, the battery 32 is also generally adhesively attached with an adhesive 114 to a tolerance accumulator 106. In more detail, in a preferred embodiment, the battery 32 is adhesively attached to a tolerance accumulator 106 of a trim module 98 of the rear housing 86. This structure provides a secure interconnection between the battery 32 and the tolerance accumulator 106. It allows the battery 32 to expand and contract in normal usage and minimize profile in the Z dimension 116. The tolerance accumulator 106 and a trim module 98 of the rear housing 86 can be adhesively connected at a downwardly facing interface 104 along a channel 110 adapted to receive adhesive, for minimal profile in the Z dimension 116.

As previously stated, the mobile electronic device 10 includes at least one of: a flip phone, slider phone, portable networking device, internet communications device, clamshell device, tablet device, radio telephone, cellular phone, mobile phone, smart phone, portable gaming device, personal digital assistant, wireless e-mail device, two-way pager, mobile computing device and handheld electronic device. In a preferred embodiment, the mobile electronic device 10 is at least one of a cellular phone, wireless computing device and tablet, for providing the look, feel, function and structure desired by users.

The housing 150 comprises a resilient material substantially capable of withstanding the harsh environment that it will be exposed to in normal use, such as a plastic, metal and the like. Likewise, the front and rear housings 34 and 86, trim module 98 and other components detailed herein, can include a resilient material as well.

As shown in FIG. 6, the stack module 152 can include a frame 12 comprising a metallic material. Preferably, it is connected to the inwardly facing side 156 of the printed circuit board 28. The frame 12 height 13 (or depth) is structurally passive or free from disadvantageously contributing to the profile or overall Z dimension 116, as detailed previously.

As best shown in FIG. 6, the stack module 152 includes a multi-layer construction comprising: the printed circuit board 28, a plurality of integrated circuits 48 being enclosed by shields populating the printed circuit board 28; and a battery 32 being attached to the shields. The multi-layer construction and lamination structure can include the PCB 28, reservoir components 48 including ICs, shields 49 and battery 32 and laminations 162 and adhesive lamination 114, provide a sturdy and durable connection and a rigid structure, while maintaining a thin Z dimension 116 desired by users.

In a preferred embodiment, the electronic component 48 in FIG. 6 and the battery 32 are attached with laminate 162, by at least one of a bonding material, liquid epoxy, adhesive, laminate, pressure sensitive adhesive and thermal bond film. The adhesive 114 can comprise one of these bonding materials as well. Advantageously, the adhesive 114 and laminate 162 provide an attachment which can be reliably applied and is sufficient to maintain a durable bond during normal use. In one embodiment, a pressure sensitive adhesive provides these desirable attributes and can allow rework.

In one embodiment, at least one of the laminate 162 and adhesive 114 can comprise being attached by at least one of a low tac material and high tac material. For example, the attachment material can be: a low tac material such a pressure sensitive adhesive to maintain a durable bond during normal use and allow detachment for rework, by delaminating or peeling in a certain use case, and a high tac material for durable bonding which is resistant to detachment. For example, the battery 32 may be attached to shield 49 via laminate 162 and tolerance accumulator 106 via adhesive 114, with a low tac material for ease of battery replacement, while other attachments may not need to be detached for rework.

Figure 2:
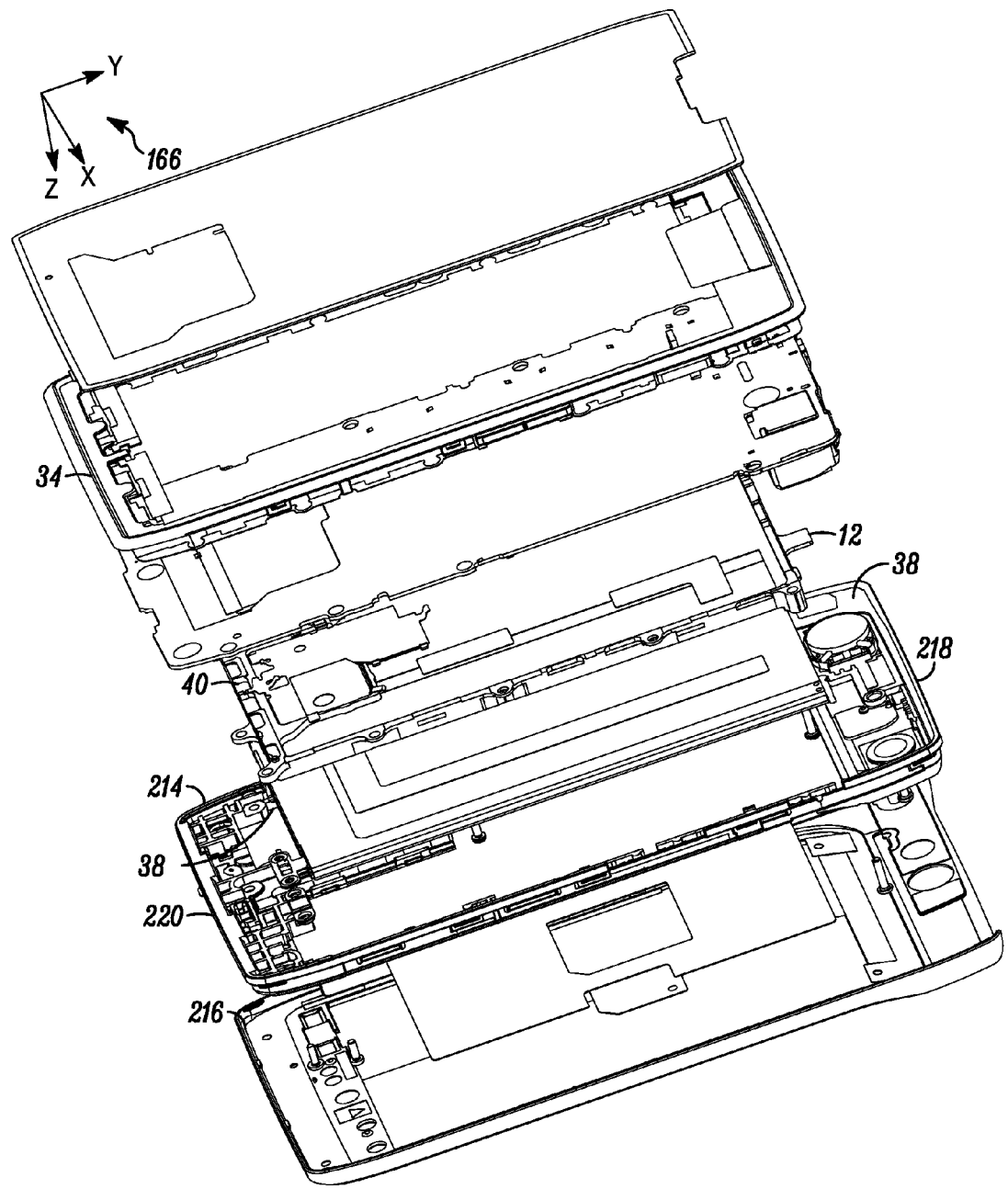
FIG. 2 is an exemplary exploded view of an embodiment of the mobile electronic device in FIG. 1, showing various components making up the mobile electronic device, in accordance with principles of the present invention.

As shown in FIGS. 2, 3 and 10, the printed circuit board 28 extends beyond the stack module 152 to receive other components not in the stack module 152 including at least one of a micro universal serial bus, a micro high definition multimedia interface, rear facing camera, front facing camera, head set jack, ear piece speaker, camera flash and microphone. These components can be in wide or narrow compartment 54 and 56, for example. These components can be tall, irregularly dimensioned or require specific placement for a particular use case, and thus may not be adapted to being located in the stack module 152. These components are useful in many use cases in connection with mobile electronic devices, such as in cell phones and tablets to name a few.

The housing 150 comprises a resilient material sufficient to withstand the harsh environment that it will be exposed to, as previously detailed.

In one embodiment, a laminate method for a mobile electronic device, is illustrated in FIG. 17. The method can include: providing a housing including a front housing 34 and a rear housing 86; providing a user interface 62 laminated, such as shown by adhesive 92, to the front housing 34; and providing a stack module 152 including a printed circuit board 28 including an outwardly facing side 154 and an inwardly facing side 156, by: laminating an electronic component 48 to the inwardly facing side 156; and laminating, shown as lamination 162, a battery 32 to the electronic component 48.

The method can further include laminating the battery 32 to the electronic component 48 on one side and laminating, shown as 114, the battery 32 to a tolerance accumulator 106 on a second side.

The method can further include laminating the battery 32 to a tolerance accumulator 106, the tolerance accumulator 106 including an inner facing surface 112 adhesively connected, as shown as 114, to the battery 32.

The method can further include laminating, as shown as 356, a frame 12 to an outer periphery 358 of an inwardly facing side 156 of the printed circuit board 28.

The method can further include laminating, as shown as 362, an outwardly facing side 154 of the printed circuit board 28 to a lower portion 360 of the front housing 34.

In one embodiment, the stack module includes a multi-layer construction comprising: the printed circuit board, a plurality of integrated circuits being enclosed by shields populating the printed circuit board; and a battery being attached to the shields.

Advantageously, in one preferred embodiment, the unique method and laminate construction, contributes to providing a device with minimal thickness in a z-dimension and enhanced integrity to withstand a harsh user environment it will be exposed to. This is different from conventional devices using connectors. For example, the planar components of the product may not individually provide significant rigidity or resistance to torsion. The planner layers such as the lens, circuit board, battery chassis and housing, are affixed to one another in a manner that provides enhanced structural integrity in a narrow profile device.

C. Mobile Electronic Device with an Enhanced Tolerance Accumulator

A mobile electronic device 10 with an enhanced tolerance accumulator 106 is disclosed. The device 10 can include: a housing 150 including a front housing 34 and a rear housing 86; and a user interface 62, the rear housing 86 including a tolerance accumulator 106. Advantageously, this construction provides a robust and durable low profile mobile electronic device, desired by users and the tolerance accumulator 106 provides a durable structure capable of expanding or contracting.

In FIG. 6, the rear housing 86 encloses a generally rectangular battery 32 located adjacent to the tolerance accumulator 106. This provides a robust construction enclosing the generally rectangular battery with a narrow profile in a Z dimension 116. In FIG. 3, the tolerance accumulator 106 includes X and Y dimensions 170 and 172 which are greater than X and Y dimensions 174 and 176 of the generally rectangular battery 32. This can provide a robust construction enclosing the generally rectangular battery 32 with a narrow profile in a Z dimension, allows expansion or swell and contraction of the tolerance accumulator 106, as needed, and allows placement or replacement of the battery 32, for example.

The rear housing 86 can include a trim module 98 attached to the tolerance accumulator 106, as shown in FIG. 6. This structure provides ease of assembly and disassembly, of the housing 150, rear housing 86, trim module 98 and tolerance accumulator 106.

The rear housing 86 can include a trim module 98 including a generally rectangular channel 108 configured to receive an adhesive 108 to attach an inner facing surface 112 of the tolerance accumulator 106 to the generally rectangular channel 110, as shown in FIG. 6. This structure simplifies attachment and helps to enhance a secure connection of the channel 108 and tolerance accumulator 106. The tolerance accumulator includes X and Y dimensions 170 and 172 are substantially similar to X and Y dimensions of the generally rectangular channel 110, for a secure connection around the periphery of the rectangular channel 110.

The housing 150 includes and encloses a battery 32 adhesively attached to the tolerance accumulator 106, for providing a sturdy narrow profile mobile electronic device. In a preferred embodiment, a trim module 98 of the rear housing 86 encloses a generally rectangular battery 32 located adjacent to the tolerance accumulator 106, as shown in FIG. 6.

The battery 32 can be adhesively attached to an inner facing surface 112 of the tolerance accumulator 106, and the battery 32 includes a Lithium Ion Polymer. In a preferred embodiment, a secure connection between the Lithium Ion Polymer and the tolerance accumulator 106 is provided. This construction contributes to minimizing the Z dimension 116. Typical Lithium Ion Polymer batteries generally include a flimsy jelly pack including a plastic bag with the polymer. They are often flimsy, narrow and require stiffeners. Advantageously, the tolerance accumulator 106 provides a thin sheet and secure boundary enclosing and protecting a side of the Lithium Ion Polymer battery. Further, the tolerance accumulator 106 provides a durable body-armor like fabric or skin adapted to expand or swell over time with the Lithium Ion Polymer.

In a preferred use case, the housing 150 includes a battery 32 adhesively attached to an inner facing surface 112 of the tolerance accumulator 106, the battery includes a Lithium Ion Polymer for enhanced battery life and desired Z dimension profile.

Turning to the user interface 62, it can include a touch screen display 64 connected to and partially enclosed in the front housing 34, for providing a narrow profile and easily accessible touch screen display to operate an electronic device, as previously detailed.

The display 68 can be located substantially adjacent to the outwardly facing side 154 of the printed circuit board 28 in FIG. 7. In one embodiment, the location can include a narrow air gap 158, to contribute to a desired narrow profile. Alternatively, a pad 160 is sandwiched between the display 68 and the outwardly facing side 154 of the printed circuit board 28. The pad 160 can provide some reinforcement in the event of an undesirable impact, bending or crushing force.

The attachment adhesives and lamination materials, have been detailed previously, and can vary depending on the use case.

In one embodiment, the tolerance accumulator 106 comprises an aramid fiber, and preferably a para-aramid synthetic fiber, for providing a durable, resilient and flexible material. Generally, aramid fibers are defined as a class of heat-resistant and strong synthetic fibers. They are used in aerospace and military applications, for ballistic rated body armor fabric and ballistic composites, in bicycle tires, and as an asbestos substitute. The name is a portmanteau of "aromatic polyamide". They are fibers in which the chain molecules are highly oriented along the fiber axis, so the strength of the chemical bond can be exploited.

One definition for aramid fiber is a manufactured fiber in which the fiber-forming substance is a long-chain synthetic polyamide in which at least 85% of the amide linkages, (—CO—NH—) are attached directly to two aromatic rings.

In one embodiment, the tolerance accumulator 106 comprises a woven sheet of an aramid fiber, for providing a thin, durable, resilient and flexible material, which can be easily connected to the rear housing 86. In one embodiment, the aramid fiber can include a combination of woven fibers, such as Kevlar with one or more of Nomex, Technora, Haracron and Twaron, for example. Aramids and para-aramid fibers can provide attractive properties, such as good strength-to-weight properties; high Young's modulus; high tenacity; low creep; and low elongation at break (~3.5%).

In one embodiment, the tolerance accumulator 106 comprises a fiber including at least one of Kevlar, Nomex, Technora, Haracron and Twaron, for providing a thin, durable, resilient and flexible material, easily connected to the rear housing 86. The above list is not exhaustive and there are other similar fibers that can be used in the invention. These fibers can expand as the battery, such as a Lithium Ion Polymer battery, expands over time, or contract.

In more detail, Kevlar is preferred. Kevlar is the registered trademark for a para-aramid synthetic fiber, related to other aramids such as Nomex, Heracron and Technora. Developed at DuPont in 1965, this high strength material was first commercially used in the early 1970s as a replacement for steel in racing tires. Typically it is spun into ropes or fabric sheets that can be used as such or as an ingredient in composite material components. Para-aramids, such as para-aramid fibers like Kevlar and Twaron, provide attractive properties, such as good strength-to-weight properties; high Young's modulus; high tenacity; low creep; and low elongation at break (~3.5%).

Currently, Kevlar has many applications, ranging from bicycle tires and racing sails to body armor because of its high tensile strength-to-weight ratio; by this measure it can be about five times stronger than steel on an equal weight basis. When used as a woven material, it is suitable for mooring lines and other applications. A similar fiber called Twaron with a similar chemical structure was developed by Akzo in the 1970s. Commercial production started in 1986, and Twaron is now manufactured by Teijin.

One of the challenges to providing a thin housing is that the battery cells expand and contract over time, based on charge, with temperature changes, etc. These changes in volume are typically accommodated using space around the battery cells. In one embodiment, advantageously, the tolerance accumulator allows the rear wall of the device to be directly affixed to a thin battery which in turn is directly affixed to the circuit board assembly. The tolerance accumulator can be made very thin and can include an aramid fiber, such as Kevlar™ fiber, to provide a flexible and robust structure that allows expansion and contraction and is aesthetically pleasing.

D. Mobile Electronic Device with an Enhanced Antenna Farm

Figure 11:
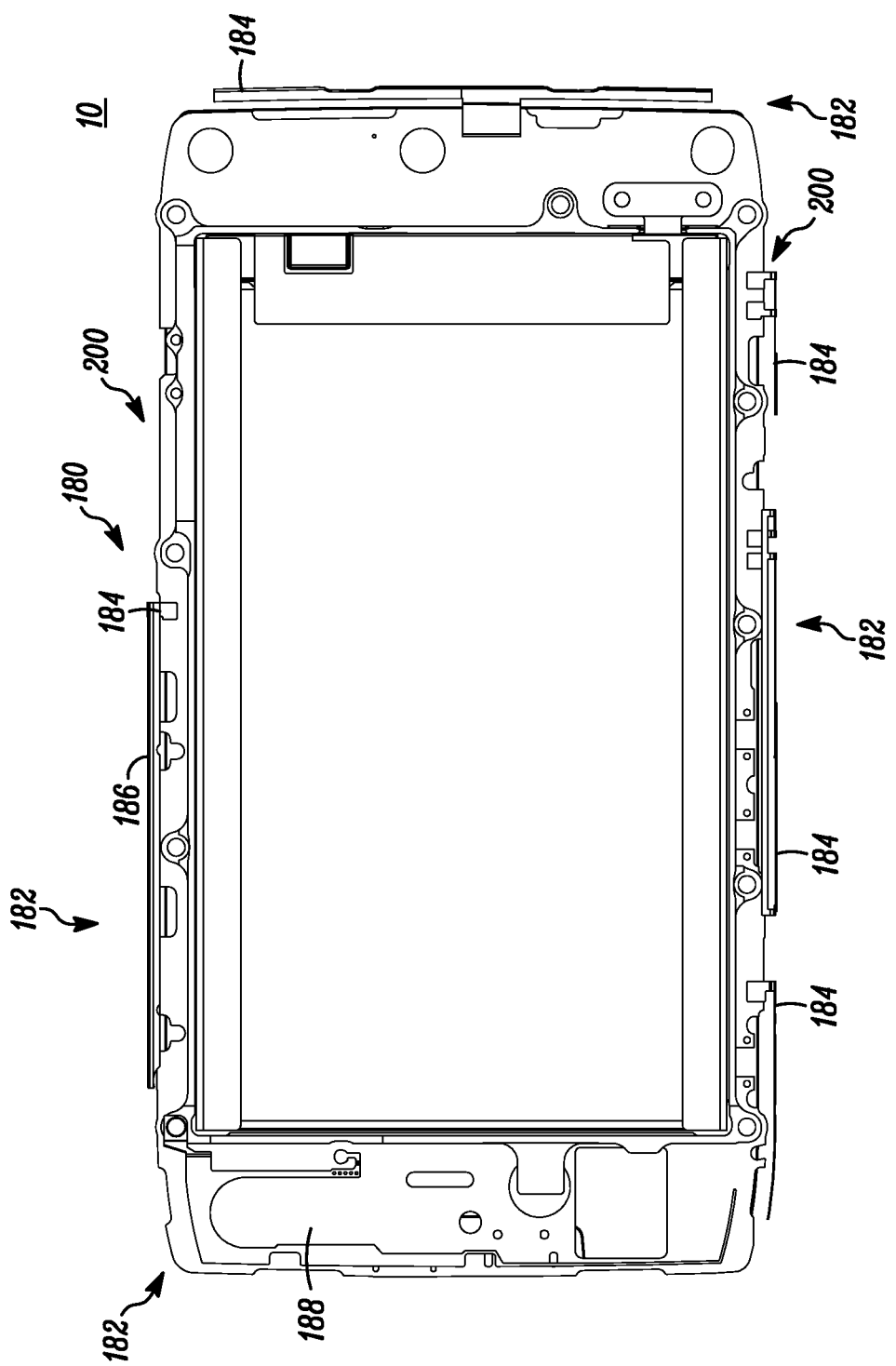
FIG. 11 is an exemplary enlarged layout view of an embodiment of the mobile electronic device in FIG. 1, showing an antenna farm and the placement of a plurality of antennas, in accordance with principles of the present invention.
Figure 12:
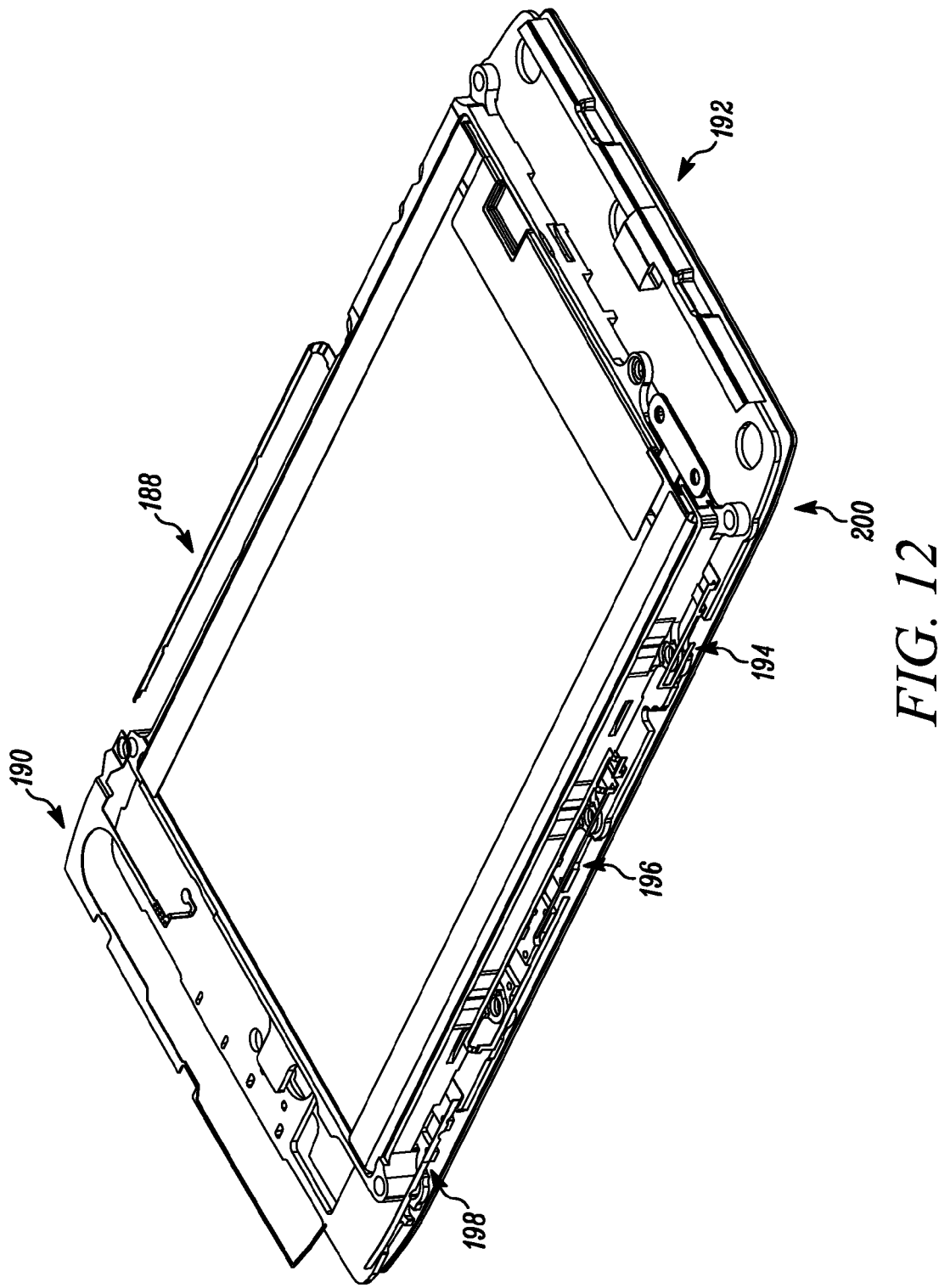
FIG. 12 is an exemplary enlarged-perspective layout view of an embodiment of the mobile electronic device in FIG. 11, showing an antenna farm and the placement of a plurality of antennas, in accordance with principles of the present invention.

A mobile electronic device 10 with an enhanced antenna farm 180 is shown in FIGS. 11 and 12. The device 10 can include: a housing 150 including a front housing 34 and a rear housing 86; and a user interface 62, the rear housing 86 includes an antenna farm 180. Advantageously, the antenna farm 180 allows wireless communication from or to multiple sources, is substantially isolated from EMI from electronic components in the device and can be made with a minimal Z dimension.

The antenna farm 180 includes a plurality on antennas 182 located on an outer periphery 94 of the rear housing 86, as illustrated in FIGS. 6 and 11. Beneficially, this placement provides minimal loss of the radio frequency (RF) waves being sent or received by the antennas 182 and accommodates a narrow profile Z dimension 116.

The antenna farm 180 includes a plurality of antennas 182 located on an outer periphery 94 of the rear housing 86, each antenna including a narrow metal pattern 184, for providing desirable antenna characteristics and a minimal Z dimension 116. In one case, each antenna including a narrow metal pattern 184 aligned in at least one of an X axis and Y axis, so as to take up minimal space requirements and minimal Z dimensions.

In one embodiment, each antenna including a narrow metal pattern 184 covered by a protective coating 186 in FIG. 11. This protective coating 186 can help to minimize undesirable scratching and damage to a metal antenna pattern, during assembly, disassembly and rework for example. It can also help to minimize undesirable delamination or separation of the antenna from the rear housing 86, during normal use. The protective coating varies, and can be easily applied where desired and not interfere with the desired RF characteristics of an antenna. In one embodiment, it can be a paint, applied over an antenna.

The plurality on antennas 182 can include at least two or more of: a diversity antenna, transceiver antenna, location antenna, WiFi antenna, Bluetooth antenna and main antenna. Having a plurality of antennas is beneficial, so a user can communicate via any desired protocol, such as GSM, CDMA, LTE and the like. The location antenna provides navigation and tracking, Bluetooth and WiFi allows communication to accessories and local hot spots, for example. As is understood, the greater number of antennas, the greater number of communication options for a user. Heavy users like as many communication options as available. As should be understood, other types of antennas can be used and this is not an extensive laundry list. As shown in FIG. 12, the plurality of antennas 182 includes: a diversity antenna 188, LTE transceiver antenna 190, main antenna 192, a BT/WiFi antenna 194, diversity antenna 196 and GPS/location antenna 198. This is simply one example of a specific layout.

The rear housing 86 includes a trim module 98 covering as least some of the plurality on antennas 182 located on an outer periphery 94 of the rear housing 86. The trim module 98 helps to protect the antenna arm 180 from damage from the outside during normal wear and tear. As shown in the drawings, the trim module 98 and rear housing 86 are separate structural components. These components and functions can be integrated into a single integrated component.

The trim module 98 comprises a resilient material that allows radio frequency signals to pass. The resilient material can include a material substantially capable of withstanding the harsh environment that it will be exposed to in normal use, such as a plastic and the like. In addition, the resilient material needs be chosen such that it allows RF to freely pass to and from an antenna 182 with minimal signal loss. In a preferred embodiment, the trim module comprises a polycarbonate material which allows RF to freely pass to and from the antennas with minimal signal loss and is structurally durable. The trim module 98 can include a generally rectangular dimension, for simple assembly and a narrow profile in a Z dimension 116.

As shown in FIG. 12, the antenna farm 180 includes a plurality of antennas 182 located on an outer and lower periphery 94 of the rear housing 86 being sufficiently spaced from an adjacent antenna, so as to minimally interfere with an adjacent antenna. Preferably, the plurality of antennas 182 are located on an outer periphery 94, on an edge 200. The spacing and location on an edge 200, is an attempt to provide minimal undesirable EMI to an adjacent antenna and the components within the frame 12.

Preferably, the antennas 182 are strategically located and substantially equi-spaced on each side and around the device 10, to provide a sufficient distance from adjacent antennas to minimize undesirable EMI leakage to adjacent antennas.

The housing 150 includes a shield defined by the frame 12, between electronic or reservoir components 48 and the antenna farm 180. Advantageously, providing shielding between certain components and the antenna farm from undesirable electromagnetic interference (EMI), is quite important in allowing the antenna farm to function as intended and certain components to perform as intended. As is known, EMI is a disturbance that affects an electrical circuit due to either electromagnetic induction or electromagnetic radiation emitted from an external source. The disturbance may interrupt, obstruct, or otherwise degrade or limit the effective performance of a circuit. The source may be any object, artificial or natural, that carries rapidly changing electrical currents, such as an electrical circuit, an antenna, and the like.

In a preferred embodiment, the housing 150 includes a frame 12 comprising a metallic material. The frame 12 is utilized to help align and connect components. The metal frame provides shielding and can be grounded to the printer circuit board, for improved EMI protection. The frame 12 is connected to a printed circuit board 28, defining a reservoir area 46 configured to receive reservoir components 48. As previously detailed, reservoir components 48 can include chips, chips with shields, and the like on a circuit board and a battery 32. Many of the reservoir components are shielded.

Providing shielding between reservoir components 48 and the antenna farm 180 from undesirable EMI, is advantageous. It is also beneficial to provide shielding in a narrow profile mobile electronic device. The frame 12 can further include an upper portion 14 and a lower portion 16 defining a narrow profile height 13 having an open top 20 and an open bottom 22, and include an interior portion 24 configured to surround components in a predetermined arrangement and the open top 20 being configured to receive components 48 on the printed circuit board 28 and the open bottom 22 being configured to receive a battery. Advantageously, this structure helps to provide a low profile mobile electronic device with enhanced shielding.

The user interface 62 can include a touch screen display 64 connected to the front housing 34. Users desire touch screen displays to operate electronic devices. The mobile electronic device 10 can vary widely, as previously detailed, and a cell phone, wireless computing device and tablet are preferred use cases.

Among the challenges to providing a thin, densely packed wireless device is providing efficient antenna performance. Antenna performance has a direct impact on the user experience, both in terms of signal strength and battery life. In one embodiment, advantageously, the antenna farm provides a multitude of antennas positioned around the perimeter of a wireless communication device, such as a phone. The antennas are mounted in a manner that enhances wireless performance and tries to avoid contributing to the z-axis profile or thickness of the device.

E. A Mobile Electronic Device with Enhanced Impact Absorber

Figure 13:
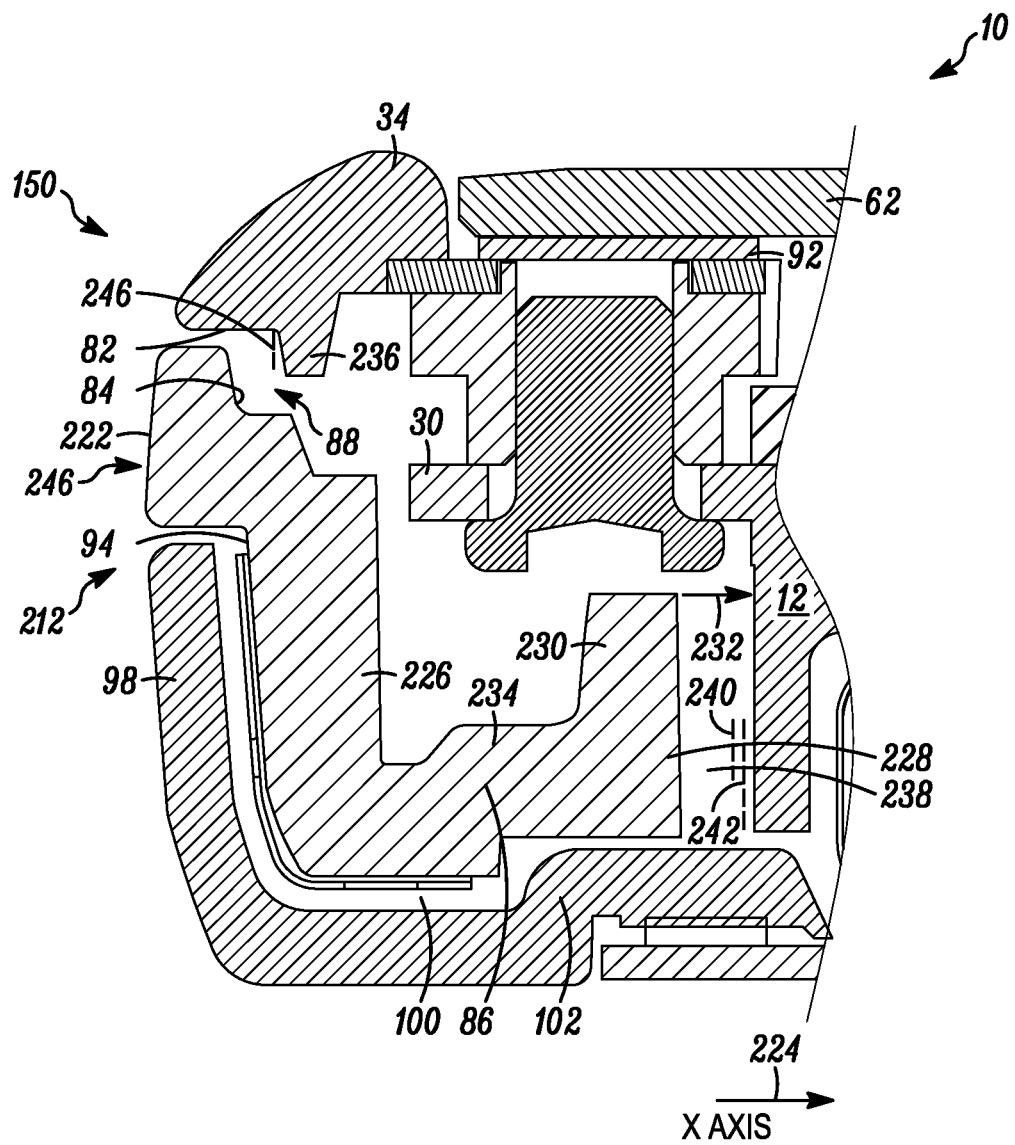
FIG. 13 is an enlarged partially cut-away exemplary sectional view of an embodiment of the mobile electronic device in FIG. 6, showing an impact absorber 210 and various components making up the mobile electronic device, in accordance with principles of the present invention.
Figure 14:
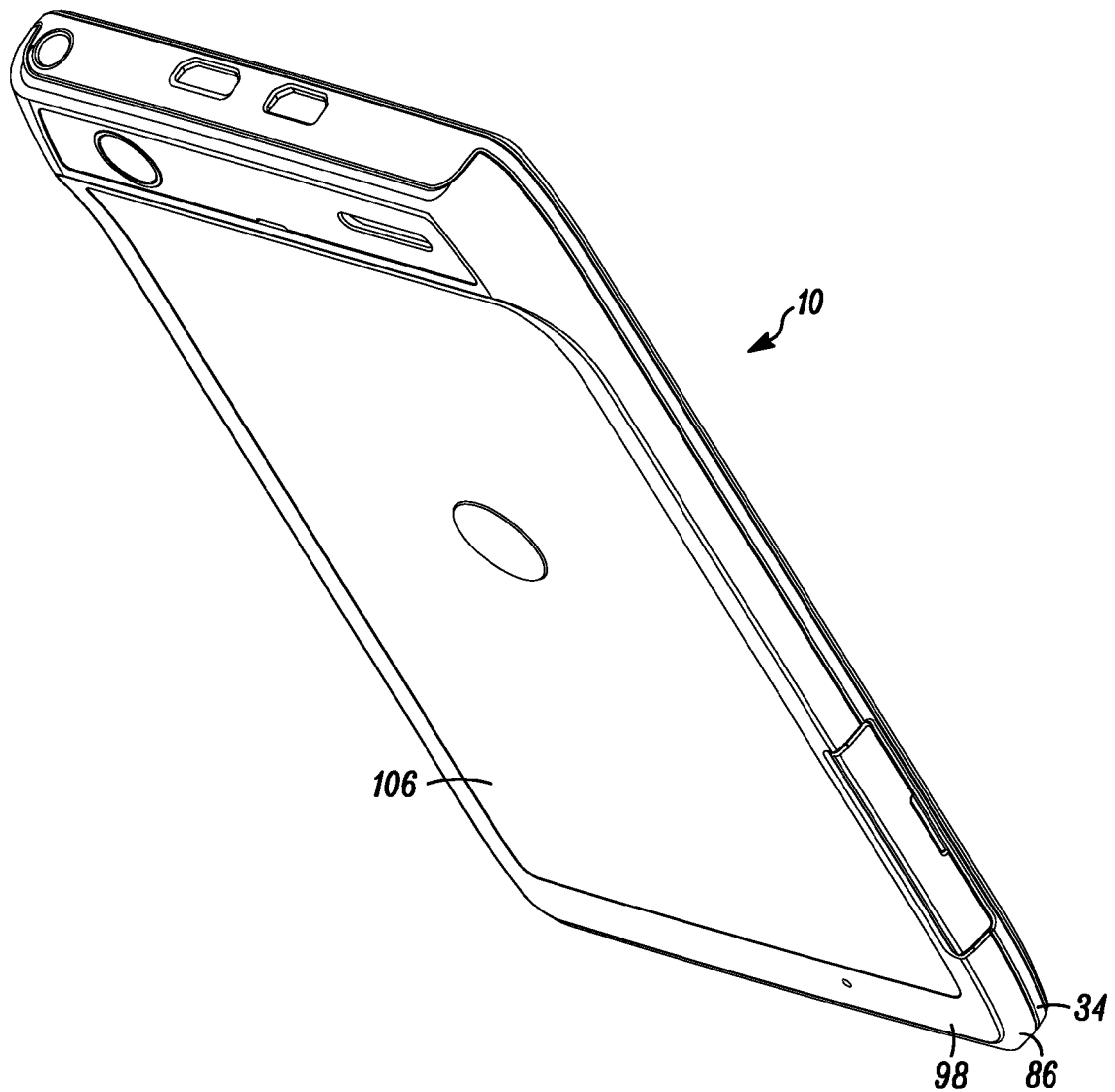
FIG. 14 is an exemplary rear perspective view of a mobile electronic device in FIG. 1, in accordance with principles of the present invention.

A mobile electronic device 10 with enhanced impact absorber is disclosed. The device 10 can include: a housing 150 including a front housing 34 and a rear housing 86; and a user interface 62, the rear housing 86 including an impact absorber 210 located on an outer most portion of the rear housing 86. Beneficially, the impact absorber can provide enhanced impact mitigation, as shown in FIG. 13. The impact absorber 210 can allow a mobile electronic device to sustain an impact and mitigate damage to the housing 150 and associated components therein.

The impact absorber 210 is located on at least three walls for improved impact resistance at, at least three locations, such as at, at least each side wall and a bottom wall, as shown in FIGS. 2 and 3. Preferably, the impact absorber 210 is located around the entire outer portion 212, for enhanced mitigation of impact. Beneficially, an impact absorber 210 located on the outer portion 212, for example, the side-most portions and top and bottom-most portions, can allow a mobile electronic device to sustain a modest impact, free from permanent damage to the housing and components therein.

The impact absorber 210 includes a bumper portion 222 located on an outer most portion 212 of the impact absorber. The bumper portion 222 location is strategically located to receive a majority of impacts.

The impact absorber 210 comprises a resilient and flexible material. The resilient and flexible material can include a material substantially capable of withstanding the harsh environment that it will be exposed to in normal use, such as a plastic, and preferably a polycarbonate, glass filled polycarbonite and the like, that has desirable characteristics which allow it to flex on modest impacts without permanent deformation, is durable, scratch resistant and is flexible and resilient on impact.

As illustrated in FIG. 13, a sectional view of the impact absorber 210 is generally U-shaped and is configured to allow a threshold lateral travel along an X direction along X axis 224. The generally U-shape configuration includes a bumper portion 222 on one vertical leg and a stopper 228 on a second vertical leg 230, and is configured to allow a threshold lateral travel 232 (in dashed line) parallel to a horizontal leg 234.

For example, in the event of a first intermediate impact or drop, the impact absorber 210 is configured to allow a threshold lateral travel 232 along an X direction parallel with the X axis 224, absorbing much of the impact without permanent deformation. The threshold lateral travel 232 is defined by the stopper 228 contacting a frame 12 in the housing 150.

In the event of a second intermediate impact, more severe than the first, the bumper 222 receives an impact and the generally U-shaped impact absorber 210 moves laterally until the stopper 228 contacts the frame 12. The impact absorber 210 absorbs some of the impact and transfers some of the impact to the frame 12. In a preferred embodiment, the frame 12 is made of a metallic material and can withstand a certain threshold impact. This impact can occur without permanent structural damage to the frame 12 and impact absorber 210, up to a certain threshold based on the severity of the impact.

In one embodiment, the surface opposite the bumper 222, defined as the upper and inner periphery 84 of the rear housing 86, is free from contacting a flange 236 of the front housing 34. For example, in the event of an intermediate impact, the impact absorber 210 is configured to allow a threshold lateral travel and the outer and lower periphery 82 of the front housing 34 and flange 236 do not contact the upper and inner periphery 84 of the rear housing 86, due to gap 88, thus protecting the user interface.

The housing 150 includes a frame 12 comprising a metallic material, selects such that it can withstand a certain threshold impact, and thus protect many components in the housing 150.

In a preferred embodiment, the impact absorber 210 includes a first stage action configured to allow a threshold lateral movement from its original at rest position upon a bumper impact 246, shown as first stage position 240 in FIG. 13 and thereafter the impact absorber returns back to its original at rest position, whereby the impact absorber 210 absorbs or retains a substantial portion of the impact force. In the event of a more severe bumper impact at 246, the impact absorber 210 includes a second stage action or position 242 configured to allow a lateral movement upon bumper impact 246 of the impact absorber 210 from its original position, the lateral movement is defined by a stopper portion 228, and thereafter the impact absorber 210 returns back to its original at rest position, whereby the impact absorber 210 transfers a substantial portion of the impact force via the stopper portion 228 to the frame 12. The gap 238 allows the lateral movement. And, the impact absorber 210 substantially isolates the front cover 34 upon bumper impact 246, due to the gap 88 and due to not contacting the front cover flange 236.

In FIG. 13, the rear housing 86 includes a trim module 98 located adjacent to an outer periphery 94 of the rear housing 86. The trim module 98 helps to reinforce a mobile electronic device from impacts. The trim module 98 can comprise a generally rectangular dimension, to reinforce the mobile electronic device.

The frame 12 is connected to a printed circuit board 28, defining a reservoir area 48 configured to receive reservoir components. The reservoir components 48 can include chips, chips with shields, and the like on a circuit board and a battery. The impact absorber 210 and frame 12 help to protect these components from certain impacts. Many details of the frame 12 have been previously detailed. Advantageously, this structure helps to provide a low profile mobile electronic device with enhanced impact resistance.

The user interface 62 includes a touch screen display 64 connected to the front housing 34. Users like using touch screen displays 64, and providing the impact absorber 210 with enhanced impact resistance, can help to protect the device 10.

A major challenge to making thinner products with large displays is accommodating harmful forces, such as those experienced when a dropped handset or device hits the ground. In one embodiment, advantageously, a unique impact mitigation structure is provided that works with the chassis, to absorb certain forces and direct them away from components to help mitigate undesirable impacts.

Among the many advantages of the mobile electronic device are: superior capabilities, enhanced durability and performance, enhanced Z dimension, reliability, comfortable, light weight, portable, user friendly, easy to use, economical, and attractive.

Although embodiments of the invention have been shown and described, it is to be understood that various modifications, substitutions, and rearrangements of parts, components, and/or process steps, as well as other uses of the mobile electronic device can be made by those skilled in the art without departing from the novel spirit and scope of this invention.

What is claimed is:

1. A mobile electronic device configured to allow for expansion and contraction of a battery, the mobile electronic device comprising:
   a battery associated with powering the mobile electronic device;
   a frame comprising a structurally passive height effective to keep the frame from contributing to an overall height of the mobile electronic device;
   a front housing component comprising a user interface and configured to connect to the frame via at least a first connector; and
   a rear housing component configured to connect to the frame via at least a second connector and enclose the battery, the rear housing comprising:
      a trim module comprising a channel configured to receive an adhesive; and
   a tolerance accumulator attached to the trim module via the adhesive, the battery being adhesively attached to an inner facing surface of the tolerance accumulator, the tolerance accumulator configured to expand and contract as the battery expands and contracts.

2. A mobile electronic device in accordance with claim 1, wherein the tolerance accumulator includes X and Y dimensions which are greater than X and Y dimensions of the battery.

3. A mobile electronic device in accordance with claim wherein the battery is disposed between the tolerance accumulator and the front housing.

4. A mobile electronic device in accordance with claim 1, wherein the front housing comprises an outer and lower periphery complementarily configured to be nested with and received by an upper and inner periphery of the rear housing effective to maintain a gap between the front housing and the rear housing when the front housing is nested with the rear housing.

5. A mobile electronic device in accordance with claim 1, wherein the rear housing comprises an outer and lower periphery complementarily configured to be nested with and received by an upper and inner periphery of the trim module effective to maintain a gap between the rear housing and the trim module when the rear housing is nested with the trim module.

6. A mobile electronic device in accordance with claim 1, wherein the battery comprises a rectangular-shaped battery.

7. A mobile electronic device in accordance with claim 1, wherein the battery includes a Lithium Ion Polymer.

8. A mobile electronic device in accordance with claim 1, wherein the user interface includes a touch screen display connected to the front housing.

9. A mobile electronic device in accordance with claim 1, wherein the user interface includes a touch screen display including a lens bonded to a display.

10. A mobile electronic device in accordance with claim 1 wherein the housing comprises:
    a stack module comprising a printed circuit board having an outwardly facing side and an inwardly facing side; and
    an electronic component attached to the inwardly facing side of the printed circuit board,
    wherein the battery is attached to the electronic component, and
    wherein the user interface includes a display being located substantially adjacent to the outwardly facing side of the printed circuit board.

11. A mobile electronic device in accordance with claim 10, wherein the display is located adjacent to the outwardly facing side of the printed circuit board, and a pad is positioned between the display and the outwardly facing side of the printed circuit board.

12. A mobile electronic device in accordance with claim 10, wherein the electronic component includes a plurality of shielded or unshielded integrated circuits connected to the inwardly facing side of the printed circuit board.

13. A mobile electronic device in accordance with claim 1 wherein the mobile electronic device includes at least one of:
    a flip phone;
    a slider phone;
    a portable networking device;
    a internet communications device;
    a clamshell device;
    a tablet device;
    a radio telephone;
    a cellular phone;
    a mobile phone;
    a smart phone;
    a portable gaming device;
    a personal digital assistant;
    a wireless email device;
    a two-way pager;
    a mobile computing device, or
    a handheld electronic device.

14. A mobile electronic device in accordance with claim 1, wherein the housing comprises a resilient material.

15. A mobile electronic device in accordance with claim 1, wherein the adhesive comprises at least one of:
    a bonding material;
    a liquid epoxy;
    a laminate;
    a pressure sensitive adhesive; or
    a thermal bond film.

16. A mobile electronic device in accordance with claim 1, wherein the adhesive comprises at least one of:
    a low tac material; or
    a high tac material.

17. A mobile electronic device in accordance with claim 1, wherein the tolerance accumulator comprises an aramid fiber.

18. A mobile electronic device in accordance with claim 1, wherein the tolerance accumulator comprises a woven sheet of an aramid fiber.

19. A mobile electronic device in accordance with claim 1, wherein the tolerance accumulator comprises a fiber including at least one of:
    Kevlar;
    Nomex;
    Technora;
    Haracron; or
    Twaron.

20. A mobile electronic device in accordance with claim 1, wherein the tolerance accumulator comprises a para-aramid synthetic fiber.

* * * * *